US011307387B2

(12) United States Patent
Huang

(10) Patent No.: US 11,307,387 B2
(45) Date of Patent: Apr. 19, 2022

(54) OPTICAL IMAGING SYSTEM INCLUDING SEVEN LENSES OF +-++-+-, +-+-++- OR +-+-+-- REFRACTIVE POWERS

(71) Applicant: ZHEJIANG SUNNY OPTICAL CO., LTD, Ningbo (CN)

(72) Inventor: Lin Huang, Ningbo (CN)

(73) Assignee: ZHEJIANG SUNNY OPTICAL CO., LTD, Zhejiang (CN)

( * ) Notice: Subject to any disclaimer, the term of this patent is extended or adjusted under 35 U.S.C. 154(b) by 0 days.

(21) Appl. No.: 16/614,095

(22) PCT Filed: Nov. 8, 2018

(86) PCT No.: PCT/CN2018/114511
§ 371 (c)(1),
(2) Date: Nov. 15, 2019

(87) PCT Pub. No.: WO2019/210672
PCT Pub. Date: Nov. 7, 2019

(65) Prior Publication Data
US 2021/0072507 A1 Mar. 11, 2021

(30) Foreign Application Priority Data
May 2, 2018 (CN) .......................... 201810410328.9

(51) Int. Cl.
G02B 13/00 (2006.01)
G02B 9/64 (2006.01)
(52) U.S. Cl.
CPC ........... G02B 13/0045 (2013.01); G02B 9/64 (2013.01)

(58) Field of Classification Search
CPC ............................. G02B 13/0045; G02B 9/64
See application file for complete search history.

(56) References Cited

U.S. PATENT DOCUMENTS 10,012,818 B2 7/2018 Tang et al.
2017/0082835 A1 3/2017 Tang et al.
(Continued)

FOREIGN PATENT DOCUMENTS

CN 107422465 A 12/2017
CN 107577034 A 1/2018
(Continued)

OTHER PUBLICATIONS

International Search Report dated Feb. 2, 2019, in connection with PCT International Application No. PCT/CN2018/114511.
(Continued)

Primary Examiner — Wen Huang
(74) Attorney, Agent, or Firm — Norris McLaughlin, P.A.

(57) ABSTRACT

An optical imaging system including, sequentially from an object side to an image side along an optical axis, a first lens, a second lens, a third lens, a fourth lens, a fifth lens, a sixth lens and a seventh lens. The first lens and the third lens each has a positive refractive power. The second lens, the fourth lens, the fifth lens, the sixth lens, and the seventh lens each has a positive or a negative refractive power. An object-side surface of the first lens is convex, and an image-side surface thereof is concave. An image-side surface of the second lens is concave. An object-side surface of the third lens is convex. An object-side surface of the seventh lens is convex, and an image-side surface thereof is concave. A total effective focal length f of the system and an entrance pupil diameter EPD of the system satisfy: f/EPD≤1.5.

9 Claims, 11 Drawing Sheets

(56) References Cited

U.S. PATENT DOCUMENTS

2018/0188483 A1* 7/2018 Hsieh .................. G02B 27/0025
2019/0137736 A1* 5/2019 Huh ................... G02B 13/0045

FOREIGN PATENT DOCUMENTS

| CN | 107741630 A | 2/2018 |
| CN | 107831588 A | 3/2018 |
| CN | 108535843 A | 9/2018 |
| CN | 208334755 U | 1/2019 |
| TW | I604210 B | 11/2017 |

OTHER PUBLICATIONS

English Translation of International Search Report dated Feb. 2, 2019, in connection with PCT International Application No. PCT/CN2018/114511.

* cited by examiner

OPTICAL IMAGING SYSTEM INCLUDING SEVEN LENSES OF +−++−+−, +−+−++− OR +−+−+−− REFRACTIVE POWERS

CROSS-REFERENCE TO RELATED APPLICATION

This application is a 371 of PCT/CN2018/114511, filed Nov. 8, 2018, which claims the priority from Chinese Patent Application No. 201810410328.9, filed in the National Intellectual Property Administration (CNIPA) on May 2, 2018, the disclosure of which is hereby incorporated by reference in its entirety.

TECHNICAL FIELD

The present disclosure relates to an optical imaging system, and more specifically to an optical imaging system including seven lenses.

BACKGROUND

With the development of science and technology, portable electronic products are gradually emerging, and portable electronic products with camera functions are favored by people. Therefore, the demand for camera lenses assembly suitable for portable electronic products is gradually increasing. On the one hand, since the portable electronic products tend to be miniaturized, the total length of the lens assembly is limited, thereby the design difficulty of the lens assembly is increased. On the other hand, as the performance of the conventional photosensitive elements such as a photosensitive Charge-Coupled Device (CCD) or a Complementary Metal-Oxide Semiconductor (CMOS) is improved and the size thereof is reduced, the number of pixels of the photosensitive element is increased and the pixel size is reduced, and therefore higher requirements are placed on high image quality and miniaturization of the matched imaging lens assembly.

In order to meet the requirements for miniaturization, a typical imaging lens assemblies generally have an aperture number (F-number) of 2.0 or more, so as to have a good optical performance while achieving the miniaturization. However, with the continuous development of portable electronic products such as smart phones, higher requirements for the matched imaging lens assemblies have been brought forward. Especially in situations such as insufficient light (e.g., cloudy or rainy days, dusk and so on) or hand shake, the lens assemblies having the F-number of 2.0 or more have been unable to fulfill the higher-order imaging requirements.

SUMMARY

The present disclosure provides an optical imaging system that is applicable to portable electronic products and at least solves or partially addresses at least one of the above disadvantages of the prior art.

In one aspect, the present disclosure provides an optical imaging system including, sequentially from an object side to an image side along an optical axis, a first lens, a second lens, a third lens, a fourth lens, a fifth lens, a sixth lens and a seventh lens. Wherein, the first lens and the third lens each may have a positive refractive power; the second lens, the fourth lens, the fifth lens, the sixth lens, and the seventh lens each has a positive refractive power or a negative refractive power; an object-side surface of the first lens may be a convex surface, and an image-side surface of the first lens may be a concave surface; an image-side surface of the second lens may be a concave surface; an object-side surface of the third lens may be convex surface; and an object-side surface of the seventh lens may be a convex surface, and an image-side surface of the seventh lens may be a concave surface. Wherein, a total effective focal length f of the optical imaging system and an entrance pupil diameter EPD of the optical imaging system may satisfy f/EPD≤1.5; and a center thickness CT7 of the seventh lens on the optical axis, a center thickness CT5 of the fifth lens on the optical axis, and half of a maximal field-of-view HFOV of the optical imaging system may satisfy 1<CT7/CT5×TAN(HFOV)<2.

In an implementation, a radius of curvature R1 of the object-side surface of the first lens and a radius of curvature R2 of the image-side surface of the first lens may satisfy −3<(R1+R2)/(R1−R2)<−2.

In an implementation, a total effective focal length f of the optical imaging system, a radius of curvature R3 of an object-side surface of the second lens and a radius of curvature R5 of the object-side surface of the third lens may satisfy −0.5≤f/R3−f/R5<0.3.

In an implementation, an effective focal length f2 of the second lens and an effective focal length f4 of the fourth lens may satisfy −1.5<(f2−f4)/(f2+f4)<−0.5.

In an implementation, a maximum effective radius DT71 of the object-side surface of the seventh lens and a maximum effective radius DT31 of the object-side surface of the third lens may satisfy 1.5<DT71/DT31<2.5.

In an implementation, an axial distance SAG62 from an intersection of an image-side surface of the sixth lens and the optical axis to an apex of a maximum effective radius of the image-side surface of the sixth lens and a center thickness CT6 of the sixth lens on the optical axis may satisfy 0.5<|SAG62/CT6|<2.

In an implementation, an effective focal length f1 of the first lens, an effective focal length f3 of the third lens, an effective focal length f5 of the fifth lens, and an effective focal length f6 of the sixth lens may satisfy 0<(1/f5+1/f6)/(1/f1+1/f3)<0.5.

In an implementation, a center thickness CT3 of the third lens on the optical axis and a spaced distance T34 of the third lens and the fourth lens on the optical axis may satisfy 1.0≤CT3/T34<1.5.

In an implementation, a distance TTL on the optical axis from the object-side surface of the first lens to an imaging plane of the optical imaging system and half of a diagonal length ImgH of an effective pixel area on the imaging plane of the optical imaging system may satisfy TTL/ImgH<1.5.

In an implementation, a sum of spaced distances ΣAT on the optical axis between adjacent lenses of the first lens to the seventh lens, a spaced distance T56 of the fifth lens and the sixth lens on the optical axis and a spaced distance T12 of the first lens and the second lens on the optical axis may satisfy 4.5<ΣAT/(T56+T12)<6.

In another aspect, the present disclosure provides an optical imaging system including, sequentially from an object side to an image side along an optical axis, a first lens, a second lens, a third lens, a fourth lens, a fifth lens, a sixth lens and a seventh lens. Wherein, the first lens and the third lens each may have a positive refractive power; the second lens, the fourth lens, the fifth lens, the sixth lens, and the seventh lens each has a positive refractive power or a negative refractive power; an object-side surface of the first lens may be a convex surface, and an image-side surface of the first lens may be a concave surface; an image-side surface of the second lens may be a concave surface; an object-side surface of the third lens may be convex surface; and an object-side surface of the seventh lens may be a convex surface, and an image-side surface of the seventh lens may be a concave surface. Wherein, a total effective focal length f of the optical imaging system, a radius of curvature R3 of an object-side surface of the second lens and a radius of curvature R5 of the object-side surface of the third lens may satisfy −0.5≤f/R3−f/R5<0.3.

In yet another aspect, the present disclosure provides an optical imaging system including, sequentially from an object side to an image side along an optical axis, a first lens, a second lens, a third lens, a fourth lens, a fifth lens, a sixth lens and a seventh lens. Wherein, the first lens and the third lens each may have a positive refractive power; the second lens, the fourth lens, the fifth lens, the sixth lens, and the seventh lens each has a positive refractive power or a negative refractive power; an object-side surface of the first lens may be a convex surface, and an image-side surface of the first lens may be a concave surface; an image-side surface of the second lens may be a concave surface; an object-side surface of the third lens may be convex surface; and an object-side surface of the seventh lens may be a convex surface, and an image-side surface of the seventh lens may be a concave surface. Wherein, a radius of curvature R1 of the object-side surface of the first lens and a radius of curvature R2 of the image-side surface of the first lens may satisfy −3<(R1+R2)/(R1−R2)<−2.

In yet another aspect, the present disclosure provides an optical imaging system including, sequentially from an object side to an image side along an optical axis, a first lens, a second lens, a third lens, a fourth lens, a fifth lens, a sixth lens and a seventh lens. Wherein, the first lens and the third lens each may have a positive refractive power; the second lens, the fourth lens, the fifth lens, the sixth lens, and the seventh lens each has a positive refractive power or a negative refractive power; an object-side surface of the first lens may be a convex surface, and an image-side surface of the first lens may be a concave surface; an image-side surface of the second lens may be a concave surface; an object-side surface of the third lens may be convex surface; and an object-side surface of the seventh lens may be a convex surface, and an image-side surface of the seventh lens may be a concave surface. Wherein, a maximum effective radius DT71 of the object-side surface of the seventh lens and a maximum effective radius DT31 of the object-side surface of the third lens may satisfy 1.5<DT71/DT31<2.5.

In yet another aspect, the present disclosure provides an optical imaging system including, sequentially from an object side to an image side along an optical axis, a first lens, a second lens, a third lens, a fourth lens, a fifth lens, a sixth lens and a seventh lens. Wherein, the first lens and the third lens each may have a positive refractive power; the second lens, the fourth lens, the fifth lens, the sixth lens, and the seventh lens each has a positive refractive power or a negative refractive power; an object-side surface of the first lens may be a convex surface, and an image-side surface of the first lens may be a concave surface; an image-side surface of the second lens may be a concave surface; an object-side surface of the third lens may be convex surface; and an object-side surface of the seventh lens may be a convex surface, and an image-side surface of the seventh lens may be a concave surface. Wherein, an axial distance SAG62 from an intersection of an image-side surface of the sixth lens and the optical axis to an apex of a maximum effective radius of the image-side surface of the sixth lens and a center thickness CT6 of the sixth lens on the optical axis may satisfy 0.5<|SAG62/CT6|<2.

In yet another aspect, the present disclosure provides an optical imaging system including, sequentially from an object side to an image side along an optical axis, a first lens, a second lens, a third lens, a fourth lens, a fifth lens, a sixth lens and a seventh lens. Wherein, the first lens and the third lens each may have a positive refractive power; the second lens, the fourth lens, the fifth lens, the sixth lens, and the seventh lens each has a positive refractive power or a negative refractive power; an object-side surface of the first lens may be a convex surface, and an image-side surface of the first lens may be a concave surface; an image-side surface of the second lens may be a concave surface; an object-side surface of the third lens may be convex surface; and an object-side surface of the seventh lens may be a convex surface, and an image-side surface of the seventh lens may be a concave surface. Wherein, a sum of spaced distances ΣAT on the optical axis between adjacent lenses of the first lens to the seventh lens, a spaced distance T56 of the fifth lens and the sixth lens on the optical axis and a spaced distance T12 of the first lens and the second lens on the optical axis may satisfy 4.5<ΣAT/(T56+T12)<6.

In yet another aspect, the present disclosure provides an optical imaging system including, sequentially from an object side to an image side along an optical axis, a first lens, a second lens, a third lens, a fourth lens, a fifth lens, a sixth lens and a seventh lens. Wherein, the first lens and the third lens each may have a positive refractive power; the second lens, the fourth lens, the fifth lens, the sixth lens, and the seventh lens each has a positive refractive power or a negative refractive power; an object-side surface of the first lens may be a convex surface, and an image-side surface of the first lens may be a concave surface; an image-side surface of the second lens may be a concave surface; an object-side surface of the third lens may be convex surface; and an object-side surface of the seventh lens may be a convex surface, and an image-side surface of the seventh lens may be a concave surface. Wherein, a center thickness CT3 of the third lens on the optical axis and a spaced distance T34 of the third lens and the fourth lens on the optical axis may satisfy 1.0≤CT3/T34<1.5.

The present disclosure employs a plurality of (for example, seven) lenses, and the optical imaging system has at least one advantageous effect such as ultra-thin, miniaturization, large aperture, high resolution, and high image quality and the like by rationally distributing the refractive power, the surface shape, the center thickness of each lens, and the axial spaced distance between the lenses and the like.

BRIEF DESCRIPTION OF THE DRAWINGS

Other features, purpose and advantages of the present disclosure will become apparent through the detailed description of the non-limiting implementations given in conjunction with the accompanying drawings. In the drawings.

DETAILED DESCRIPTION OF EMBODIMENTS

Figure 1:
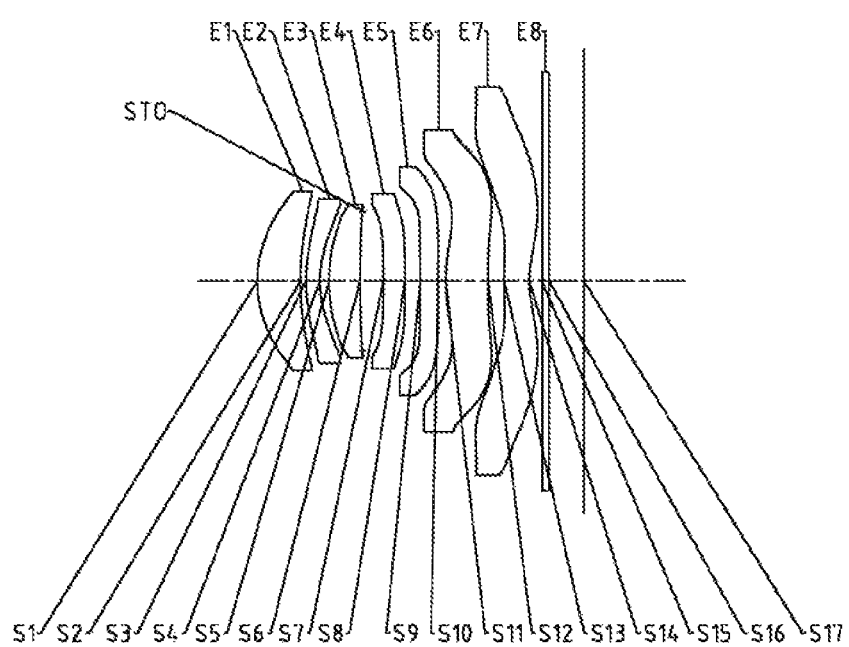
FIG. 1 illustrates a schematic structural view of an optical imaging system according to embodiment 1 of the present disclosure.

For a better understanding of the present disclosure, various aspects of the present disclosure will be described in more detail with reference to the drawings. It should be understood that the detailed descriptions are merely used for describing exemplary embodiments of the present disclosure, but not intend to limit the scope of the present disclosure. Throughout the specification, the same reference numerals designate the same elements. The expression "and/or" includes any and all combinations of one or more of the associated listed items.

It should be noted that, in the present specification, the expressions such as first, second and third are merely for distinguishing one feature from another feature without limiting the feature. Thus, a first lens discussed below could be referred to as a second lens or a third lens without departing from the teachings of the present disclosure.

In the accompanying drawings, for convenience of explanation, thicknesses, sizes and shapes of lenses have been slightly exaggerated. Specifically, spherical or aspheric shapes shown in the accompanying drawings are shown byway of examples. That is, spherical or aspheric shapes are not limited to the spherical or aspheric shapes shown in the accompanying drawings. The accompanying drawings are merely examples, and not strictly drawn to scale.

Herein, a paraxial area refers to an area near the optical axis. If a surface of a lens is a convex surface and the position of the convex is not defined, it indicates that the surface of the lens is convex at least in the paraxial area; and if a surface of a lens is a concave surface and the position of the concave is not defined, it indicates that the surface of the lens is concave at least in the paraxial area. In each lens, the surface close to the object side is referred to as an object-side surface; and in each lens, the surface close to the image side is referred to as an image-side surface.

It should be further understood that the terms "comprising," "including," "having," "containing" and/or "contain," when used in the specification, specify the presence of stated features, elements, and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing implementations of the present disclosure, refers to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the embodiments in the present disclosure and the features in the embodiments may be combined with each other on a non-conflict basis. The present disclosure will be described in detail below with reference to the accompanying drawings and in combination with the embodiments.

The features, principles, and other aspects of the present disclosure are described in detail below.

An optical imaging system according to exemplary implementations of the present disclosure may include, for example, seven lenses having a refractive power, i.e., a first lens, a second lens, a third lens, a fourth lens, a fifth lens, a sixth lens and a seventh lens. The seven lenses are sequentially arranged from an object side to an image side along an optical axis, and any two adjacent lenses among the seven lenses have an air gap therebetween.

In an exemplary implementation, the first lens may have a positive refractive power, an object-side surface thereof may be a convex surface and an image-side surface thereof may be a concave surface; the second lens has a positive refractive power or a negative refractive power, and an image-side surface thereof may be a concave surface; the third lens may have a positive refractive power, and an object-side surface thereof may be a convex surface; the fourth lens has a positive refractive power or a negative refractive power; the fifth lens has a positive refractive power or a negative refractive power; the sixth lens has a positive refractive power or a negative refractive power; and the seventh lens has a positive refractive power or a negative refractive power, an object-side surface thereof may be a convex surface and an image-side surface thereof may be a concave surface. By reasonably controlling the positive or negative refractive power of each lens in the imaging system, the low-order aberration of the system may be effectively balanced, and the tolerance sensitivity of the system may be reduced, which in turns advantageously ensure the miniaturization of the system.

In an exemplary implementation, the second lens may have a negative refractive power, and an object-side surface thereof may be a convex surface.

In an exemplary implementation, the seventh lens may have a negative refractive power.

In an exemplary implementation, the optical imaging system according to the present disclosure may satisfy: f/EPD≤1.5, where f is a total effective focal length of the optical imaging system, and EPD is an entrance pupil diameter of the optical imaging system. More specifically, f and EPD may further satisfy: 1.27≤f/EPD≤1.48. Satisfying the conditional expression f/EPD≤1.5 is advantageous to increase the amount of light passing through the lens per unit time, so that the optical imaging system has a large aperture advantage. Thereby, it is possible to enhance the imaging effect in the dark environment while reducing the aberration of edge field of view, and the distortion of the system may be effectively controlled.

In an exemplary implementation, the optical imaging system according to the present disclosure may satisfy: 1<CT7/CT5×TAN(HFOV)<2, where CT7 is a center thickness of the seventh lens on the optical axis, CT5 is a center thickness of the fifth lens on the optical axis, and HFOV is half of a maximal field-of-view of the optical imaging system. More specifically, CT7, CT5 and HFOV may further satisfy: 1<CT7/CT5×TAN(HFOV)<1.4, for example, 1.10≤CT7/CT5×TAN(HFOV)≤1.28. Satisfying the conditional expression 1<CT7/CT5×TAN(HFOV)<2 is advantageous for rationally distributing the on-axis space of the imaging system, so as to achieve the miniaturization of the system.

In an exemplary implementation, the optical imaging system according to the present disclosure may satisfy: −3<(R1+R2)/(R1−R2)<−2, where R1 is a radius of curvature of the object-side surface of the first lens, and R2 is a radius of curvature of the image-side surface of the first lens. More specifically, R1 and R2 may further satisfy: −2.74≤(R1+R2)/(R1−R2)≤−2.31. Reasonably distributing the radius of curvature of the object-side surface and the image-side surface of the first lens is advantageous for reducing the aberrations of the system, such as coma, chromatic aberration, and the like, and improving the resolution.

In an exemplary implementation, the optical imaging system according to the present disclosure may satisfy: TTL/ImgH<1.5, where TTL is a distance on the optical axis from the object-side surface of the first lens to an imaging plane of the optical imaging system, and ImgH is half of a diagonal length of an effective pixel area on the imaging plane of the optical imaging system. More specifically, TTL and ImgH may further satisfy: 1.39≤TTL/ImgH≤1.40. Reasonably configuring TTL and ImgH is advantageous for improving the image quality and realizing the ultra-thin and miniaturization characteristics of the optical imaging system.

In an exemplary implementation, the optical imaging system according to the present disclosure may satisfy: −0.5≤f/R3−f/R5<0.3, where f is a total effective focal length of the optical imaging system, R3 is a radius of curvature of an object-side surface of the second lens, and R5 is a radius of curvature of the object-side surface of the third lens. More specifically, f, R3 and R5 may further satisfy: −0.48≤f/R3−f/R5≤0.05. By adjusting the total effective focal length of the optical imaging system, the radius of curvature of the object-side surface of the second lens, and the radius of curvature of the object-side surface of the third lens, the aberrations of the system, such as coma, chromatic aberration, and the like may be effectively reduced, and the resolution may be improved.

In an exemplary implementation, the optical imaging system according to the present disclosure may satisfy: −1.5<(f2−f4)/(f2+f4)<−0.5, where f2 is an effective focal length of the second lens, and f4 is an effective focal length of the fourth lens. More specifically, f2 and f4 may further satisfy: −1.18≤(f2−f4)/(f2+f4)≤−0.52. Reasonably controlling the contribution of the effective focal length of the second lens and the effective focal length of the fourth lens to the focal length of the entire optical system can reduce the deflection angle of the light and improve the imaging quality of the system.

In an exemplary implementation, the optical imaging system according to the present disclosure may satisfy: 1.5<DT71/DT31<2.5, where DT71 is a maximum effective radius of the object-side surface of the seventh lens, and DT31 is a maximum effective radius of the object-side surface of the third lens. More specifically, DT71 and DT31 may further satisfy: 1.86≤DT71/DT31≤2.34. By constraining DT71 and DT31, the light in the inner field of view may be blocked to reduce the off-axis coma by reducing the aperture; at the same time, the external field of view may be properly blocked to ensure the contrast is within a reasonable range.

In an exemplary implementation, the optical imaging system according to the present disclosure may satisfy: 0.5<|SAG62/CT6|<2, where SAG62 is an axial distance from an intersection of an image-side surface of the sixth lens and the optical axis to an apex of a maximum effective radius of the image-side surface of the sixth lens, and CT6 is a center thickness of the sixth lens on the optical axis. More specifically, SAG62 and CT6 may further satisfy: 0.7<|SAG62/CT6|<1.8, for example, 0.82≤|SAG62/CT6|≤1.73. Satisfying the conditional expression 0.5<|SAG62/CT6|<2 may effectively reduce the incident angle of the chief ray on the object-side surface of the sixth lens. This helps to disperse the refractive power of system, reduce the tolerance sensitivity of system, and improve the machinability of the individual lens.

In an exemplary implementation, the optical imaging system according to the present disclosure may satisfy: 4.5<ΣAT/(T56+T12)<6, where ΣAT is a sum of spaced distances on the optical axis between any two adjacent lenses of the first lens to the seventh lens, T56 is a spaced distance of the fifth lens and the sixth lens on the optical axis and T12 is a spaced distance of the first lens and the second lens on the optical axis. More specifically, ΣAT, T56 and T12 may further satisfy: 4.94≤ΣAT/(T56+T12)≤5.86. By properly distributing ΣAT, T56 and T12, the processing, molding and assembly characteristics of each lens may be ensured, which is advantageous for mass production.

In an exemplary implementation, the optical imaging system according to the present disclosure may satisfy: 0<(1/f5+1/f6)/(1/f1+1/f3)<0.5, where f1 is an effective focal length of the first lens, f3 is an effective focal length of the third lens, f5 is an effective focal length of the fifth lens, and f6 is an effective focal length of the sixth lens. More specifically, f1, f3, f5 and f6 may further satisfy: 0.08≤(1/f5+1/f6)/(1/f1+1/f3)≤0.41. By properly distributing the refractive power of the first lens, the second lens, the fifth lens and the sixth lens, the astigmatism may be corrected, the edge field of view imaging effect may be improved, and the chief ray angle (CRA) of the chip may be better matched advantageously.

In an exemplary implementation, the optical imaging system according to the present disclosure may satisfy: $1.0 \leq CT3/T34 < 1.5$, where CT3 is a center thickness of the third lens on the optical axis, and T34 is a spaced distance of the third lens and the fourth lens on the optical axis. More specifically, CT3 and T34 may further satisfy: $1.00 \leq CT3/T34 \leq 1.39$. When the conditional expression $1.0 \leq CT3/T34 < 1.5$ is satisfied, the lens size distribution is uniform, the assembly stability is ensured, the aberration of the entire imaging system is reduced, and the total length of the imaging system is shortened.

In an exemplary implementation, the optical imaging system described above may further include at least one diaphragm to enhance the imaging quality of the lens assembly. The diaphragm may be disposed at any position between the object side and the image side as needed, for example, the diaphragm may be disposed between the object side and the first lens or may be disposed between the third lens and the fourth lens.

Alternatively, the above optical imaging system may further include an optical filter for correcting the color deviation and/or a protective glass for protecting the photosensitive element on the imaging plane.

The optical imaging system according to the above implementations of the present disclosure may employ a plurality of lenses, such as seven lenses as described above. By properly distributing the refractive power of each lens, the surface shape, the center thickness of each lens, and spaced distances on the optical axis between the lenses, the size and the sensitivity of the system can be effectively reduced, and the workability of the system can be improved, such that the optical imaging system is more advantageous for production processing and may be applied to portable electronic products. In addition, the optical imaging system configured as described above also has advantageous effects such as ultra-thin, miniaturization, large aperture, high resolution, high image quality, and the like.

In the implementations of the present disclosure, at least one of the surfaces of each lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. By using an aspheric lens, the aberrations that occur during imaging can be eliminated as much as possible, and thus improving the image quality.

However, it will be understood by those skilled in the art that the number of lenses constituting the optical imaging system may be varied to achieve the various results and advantages described in this specification without departing from the technical solution claimed by the present disclosure. For example, although the implementation is described by taking seven lenses as an example, the optical imaging system is not limited to include seven lenses. The optical imaging system may also include other numbers of lenses if desired.

Specific embodiments applicable to the optical imaging system of the above implementations will be further described below with reference to the accompanying drawings.

Embodiment 1

An optical imaging system according to embodiment 1 of the present disclosure is described below with reference to FIG. 1 to FIG. 2D. FIG. 1 shows a schematic structural view of the optical imaging system according to embodiment 1 of the present disclosure.

As shown in FIG. 1, the optical imaging system according to an exemplary implementation of the present disclosure includes a first lens E1, a second lens E2, a third lens E3, a diaphragm STO, a fourth lens E4, a fifth lens E5, a sixth lens E6, a seventh lens E7, an optical filter E8 and an imaging plane S17, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a concave surface, and an image-side surface S8 of the fourth lens E4 is a convex surface. The fifth lens E5 has a negative refractive power. An object-side surface S9 of the fifth lens E5 is a concave surface, and an image-side surface S10 of the fifth lens E5 is a convex surface. The sixth lens E6 has a positive refractive power. An object-side surface S11 of the sixth lens E6 is a convex surface, and an image-side surface S12 of the sixth lens E6 is a flat surface. The seventh lens E7 has a negative refractive power. An object-side surface S13 of the seventh lens E7 is a convex surface, and an image-side surface S14 of the seventh lens E7 is a concave surface. The optical filter E8 has an object-side surface S15 and an image-side surface S16. Light from an object sequentially passes through the respective surfaces S1 to S16 and is finally imaged on the imaging plane S17.

Table 1 shows surface type, radius of curvature, thickness, material and conic coefficient of each lens of the optical imaging system in embodiment 1, wherein the units for the radius of curvature and the thickness are millimeter (mm).

TABLE 1

| Surface number | Surface type | Radius of curvature | Thickness | Refractive index | Abbe number | Conic coefficient |
|---|---|---|---|---|---|---|
| OBJ | spherical | infinite | infinite | | | |
| S1 | aspheric | 1.9190 | 0.6693 | 1.55 | 64.1 | −0.3038 |
| S2 | aspheric | 4.8505 | 0.0842 | | | 0.1099 |
| S3 | aspheric | 2.5587 | 0.2208 | 1.67 | 20.4 | −15.1490 |
| S4 | aspheric | 1.7217 | 0.1399 | | | −3.9917 |
| S5 | aspheric | 2.6340 | 0.4797 | 1.55 | 64.1 | 0.0849 |
| S6 | aspheric | 10.8814 | 0.0484 | | | 4.1234 |

TABLE 1-continued

| Surface number | Surface type | Radius of curvature | Thickness | Material Refractive index | Abbe number | Conic coefficient |
|---|---|---|---|---|---|---|
| STO | spherical | infinite | 0.3172 | | | |
| S7 | aspheric | −82.3335 | 0.3370 | 1.67 | 20.4 | 41.9536 |
| S8 | aspheric | −38.3658 | 0.2356 | | | 33.3629 |
| S9 | aspheric | −12.2902 | 0.2757 | 1.66 | 21.5 | 67.6449 |
| S10 | aspheric | −86.0360 | 0.1205 | | | 40.1060 |
| S11 | aspheric | 3.3315 | 0.6563 | 1.55 | 64.1 | 0.0185 |
| S12 | aspheric | flat surface | 0.2531 | | | 0.0000 |
| S13 | aspheric | 4.9322 | 0.3854 | 1.55 | 64.1 | 0.0545 |
| S14 | aspheric | 1.5314 | 0.2010 | | | −6.8451 |
| S15 | spherical | infinite | 0.1100 | 1.52 | 64.2 | 0.0000 |
| S16 | spherical | infinite | 0.5400 | | | 0.0000 |
| S17 | spherical | infinite | 0.5400 | | | 0.0000 |

As can be seen from Table 1, the object-side surface and the image-side surface of any one of the first lens E1 to the seventh lens E7 are aspheric. In this embodiment, the surface shape x of each aspheric lens can be defined by using, but not limited to, the following aspheric formula:

$$x = \frac{ch^2}{1 + \sqrt{1 - (k+1)c^2 h^2}} + \sum A_i h^i \qquad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient (given in the above Table 1); Ai is a correction coefficient for the i-th order of the aspheric surface. Table 2 below shows high-order coefficients A4, A6, A8, A10, A12, A16, A18 and A20 applicable to each aspheric surface S1-S14 in embodiment 1.

TABLE 2

| Surface number | A4 | A6 | A8 | A10 | A12 |
|---|---|---|---|---|---|
| S1 | 2.4601E−04 | 3.3584E−02 | −1.3648E−01 | 2.9489E−01 | −3.8131E−01 |
| S2 | −8.5738E−03 | 9.0646E−02 | −3.2224E−01 | 5.7407E−01 | −6.2972E−01 |
| S3 | 3.3450E−02 | −5.6577E−03 | −1.5487E−01 | 3.4455E−01 | 4.1446E−01 |
| S4 | −1.7061E−02 | 1.3177E−01 | −4.6271E−01 | 9.7883E−01 | −1.3553E+00 |
| S5 | −2.6260E−02 | 1.0713E−01 | −3.4327E−01 | 7.5947E−01 | −1.1217E+00 |
| S6 | −6.3267E−03 | −3.2979E−02 | 4.7381E−03 | 2.9800E−01 | −9.7898E−01 |
| S7 | −3.1838E−02 | −4.8232E−02 | −4.1955E−01 | 2.1832E+00 | −5.1338E+00 |
| S8 | 1.5492E−02 | −1.9819E−01 | 4.0292E−01 | −6.7285E−01 | 7.8826E−01 |
| S9 | 1.4773E−01 | −3.9200E−01 | 6.4772E−01 | −6.2365E−01 | 2.8129E−01 |
| S10 | 1.7670E−01 | −7.1129E−01 | 1.2410E+00 | −1.2631E+00 | 8.0348E−01 |
| S11 | 1.1943E−01 | −4.8055E−01 | 6.0863E−01 | −4.9705E−01 | 2.6249E−01 |
| S12 | 1.5514E−01 | −1.8289E−01 | 1.0646E−01 | −4.0611E−02 | 9.7745E−03 |
| S13 | −2.6782E−01 | 1.5312E−01 | −4.2498E−02 | 2.5371E−03 | 1.8371E−03 |
| S14 | −1.6604E−01 | 1.0511E−01 | −4.9476E−02 | 1.6399E−02 | −3.6221E−03 |

| Surface number | A14 | A16 | A18 | A20 |
|---|---|---|---|---|
| S1 | 3.0052E−01 | −1.4196E−01 | 3.6977E−02 | −4.0800E−03 |
| S2 | 4.3898E−01 | −1.8716E−01 | 4.4405E−02 | −4.5233E−03 |
| S3 | 3.2567E−01 | −1.6206E−01 | 4.5231E−02 | −5.4123E−03 |
| S4 | 1.2305E+00 | −6.9308E−01 | 2.1590E−01 | −2.8344E−02 |
| S5 | 1.0699E+00 | −6.2307E−01 | 2.0262E−01 | −2.8360E−02 |
| S6 | 1.5017E+00 | −1.2594E+00 | 5.6080E−01 | −1.0365E−01 |
| S7 | 6.7986E+00 | −5.2139E+00 | 2.1671E+00 | −3.7850E−01 |
| S8 | −6.1483E−01 | 3.0180E−01 | −8.1929E−02 | 9.1829E−03 |
| S9 | −4.6615E−03 | −5.1107E−02 | 1.9467E−02 | −2.2307E−03 |
| S10 | −3.2590E−01 | 8.2048E−02 | −1.1688E−02 | 7.1957E−04 |
| S11 | −8.6824E−02 | 1.7151E−02 | −1.8312E−03 | 8.0495E−05 |
| S12 | −1.3529E−03 | 8.1658E−05 | 1.3910E−06 | −2.8428E−07 |
| S13 | −5.7212E−04 | 7.5875E−05 | −4.9763E−06 | 1.3179E−07 |
| S14 | 5.1332E−04 | −4.4552E−05 | 2.1541E−06 | −4.4539E−08 |

Table 3 shows the effective focal length f1 to f7 of respective lens, the total effective focal length f of the optical imaging system, the distance TTL on the optical axis from the object-side surface S1 of the first lens E1 to the imaging plane S17 and half of the diagonal length ImgH of an effective pixel area on the imaging plane S17 in embodiment 1.

TABLE 3

| f1 (mm) | 5.37 | f6 (mm) | 6.09 |
| f2 (mm) | −8.81 | f7 (mm) | −4.23 |
| f3 (mm) | 6.23 | f (mm) | 4.10 |
| f4 (mm) | 107.20 | TTL (mm) | 5.07 |
| f5 (mm) | −21.84 | ImgH (mm) | 3.62 |

The optical imaging system in embodiment 1 satisfy the followings:

f/EPD=1.46, where f is the total effective focal length of the optical imaging system, and EPD is an entrance pupil diameter of the optical imaging system;

CT7/CT5×TAN(HFOV)=1.21, where CT7 is a center thickness of the seventh lens E7 on the optical axis, CT5 is a center thickness of the fifth lens E5 on the optical axis, and HFOV is half of a maximal field-of-view of the optical imaging system;

(R1+R2)/(R1−R2)=−2.31, where R1 is a radius of curvature of the object-side surface S1 of the first lens E1, and R2 is a radius of curvature of the image-side surface S2 of the first lens E1;

TTL/ImgH=1.40, where TTL is the distance on the optical axis from the object-side surface S1 of the first lens E1 to the imaging plane S17 of the optical imaging system, and ImgH is half of the diagonal length of the effective pixel area on the imaging plane S17 of the optical imaging system;

f/R3−f/R5=0.05, where f is the total effective focal length of the optical imaging system, R3 is a radius of curvature of the object-side surface S3 of the second lens E2, and R5 is a radius of curvature of the object-side surface S5 of the third lens E3;

(f2−f4)/(f2+f4)=−1.18, where f2 is the effective focal length of the second lens E2, and f4 is the effective focal length of the fourth lens E4;

DT71/DT31=2.34, where DT71 is a maximum effective radius of the object-side surface S13 of the seventh lens E7, and DT31 is a maximum effective radius of the object-side surface S5 of the third lens E3;

|SAG62/CT6|=0.82, where SAG62 is an axial distance from an intersection of the image-side surface S12 of the sixth lens E6 and the optical axis to an apex of a maximum effective radius of the image-side surface S12 of the sixth lens E6, and CT6 is a center thickness of the sixth lens E6 on the optical axis;

ΣAT/(T56+T12)=5.86, where ΣAT is a sum of spaced distances on the optical axis between any two adjacent lenses of the first lens E1 to the seventh lens E7, T56 is a spaced distance of the fifth lens E5 and the sixth lens E6 on the optical axis, and T12 is a spaced distance of the first lens E1 and the second lens E2 on the optical axis;

(1/f5+1/f6)/(1/f1+1/f3)=0.34, where f1 is the effective focal length of the first lens E1, f3 is the effective focal length of the third lens E3, f5 is the effective focal length of the fifth lens E5, and f6 is the effective focal length of the sixth lens E6;

CT3/T34=1.31, where CT3 is a center thickness of the third lens E3 on the optical axis, and T34 is a spaced distance of the third lens E3 and the fourth lens E4 on the optical axis.

Figure 2A:
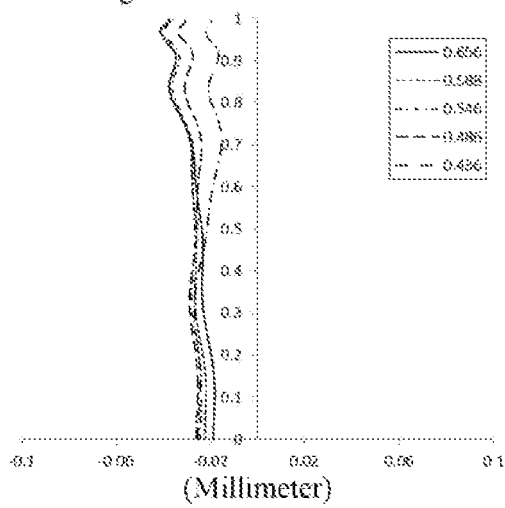
FIGS. 2A to 2D illustrate a longitudinal aberration curve, an astigmatic curve, a distortion curve and a lateral color curve of the optical imaging system of the embodiment 1, respectively.
Figure 2B:
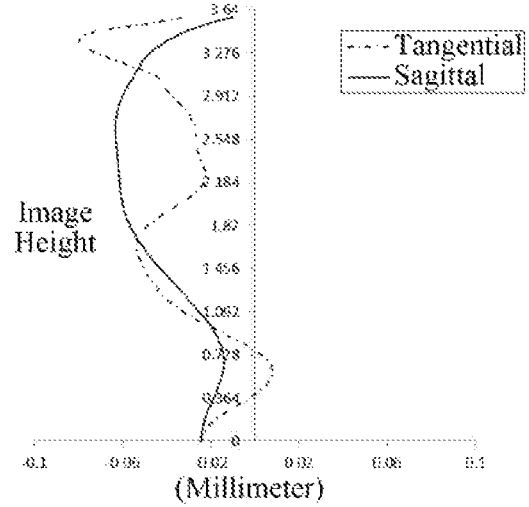
Figures 2C, 2D:
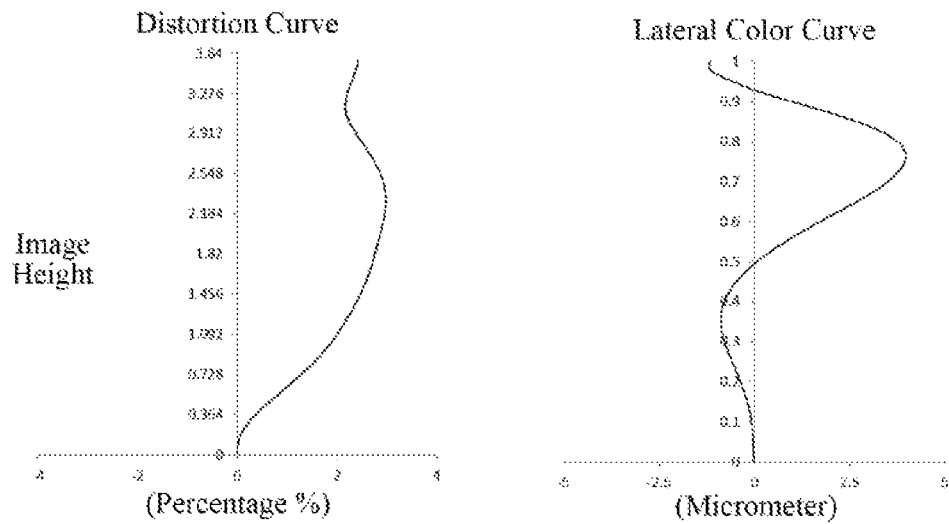

FIG. 2A illustrates a longitudinal aberration curve of the optical imaging system according to embodiment 1, representing deviations of focal points converged by light of different wavelengths after passing through the optical imaging system. FIG. 2B illustrates an astigmatism curve of the optical imaging system according to embodiment 1, representing a curvature of a tangential plane and a curvature of a sagittal plane. FIG. 2C illustrates a distortion curve of the optical imaging system according to embodiment 1, representing amounts of distortion at different field of view. FIG. 2D illustrates a lateral color curve of the optical imaging system according to embodiment 1, representing deviations of different image heights on an imaging plane after light passes through the optical imaging system. It can be seen from FIG. 2A to FIG. 2D that the optical imaging system provided in embodiment 1 can achieve good image quality.

Embodiment 2

Figure 3:
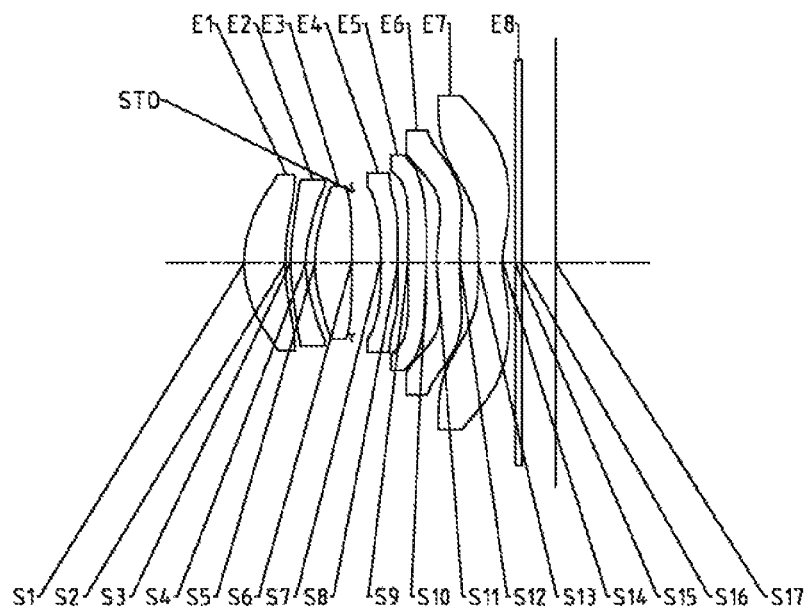
FIG. 3 illustrates a schematic structural view of an optical imaging system according to embodiment 2 of the present disclosure.

An optical imaging system according to embodiment 2 of the present disclosure is described below with reference to FIG. 3 to FIG. 4D. In this embodiment and the following embodiments, for the purpose of brevity, the description of parts similar to those in embodiment 1 will be omitted. FIG. 3 is a schematic structural view of the optical imaging system according to embodiment 2 of the present disclosure.

As shown in FIG. 3, the optical imaging system according to an exemplary implementation of the present disclosure includes a first lens E1, a second lens E2, a third lens E3, a diaphragm STO, a fourth lens E4, a fifth lens E5, a sixth lens E6, a seventh lens E7, an optical filter E8 and an imaging plane S17, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a negative refractive power. An object-side surface S7 of the fourth lens E4 is a concave surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a concave surface. The sixth lens E6 has a positive refractive power. An object-side surface S11 of the sixth lens E6 is a convex surface, and an image-side surface S12 of the sixth lens E6 is a concave surface. The seventh lens E7 has a negative refractive power. An object-side surface S13 of the seventh lens E7 is a convex surface, and an image-side surface S14 of the seventh lens E7 is a concave surface. The optical filter E8 has an object-side surface S15 and an image-side surface S16. Light from an object sequentially passes through the respective surfaces S1 to S16 and is finally imaged on the imaging plane S17.

Table 4 shows surface type, radius of curvature, thickness, material and conic coefficient of each lens of the optical imaging system in embodiment 2, wherein the units for the radius of curvature and the thickness are millimeter (mm).

TABLE 4

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 | aspheric | 1.9387 | 0.6732 | 1.55 | 64.1 | −1.7962 |
| S2 | aspheric | 4.3136 | 0.0803 | | | −19.7533 |
| S3 | aspheric | 3.0455 | 0.2500 | 1.67 | 20.4 | −6.1429 |
| S4 | aspheric | 1.8200 | 0.1530 | | | −4.1656 |
| S5 | aspheric | 2.4037 | 0.5941 | 1.55 | 64.1 | 0.3735 |
| S6 | aspheric | −1220.4160 | −0.0005 | | | 5.0000 |
| STO | spherical | infinite | 0.4772 | | | |
| S7 | aspheric | −78.0063 | 0.2800 | 1.67 | 20.4 | −80.8475 |
| S8 | aspheric | 19.4262 | 0.1647 | | | −85.8726 |
| S9 | aspheric | 13.0673 | 0.3000 | 1.65 | 23.5 | −13.1665 |
| S10 | aspheric | 14.9942 | 0.1689 | | | −3.1200 |
| S11 | aspheric | 3.3728 | 0.3796 | 1.55 | 64.1 | −2.7326 |
| S12 | aspheric | 42.1845 | 0.2966 | | | −37.7572 |
| S13 | aspheric | 38.5224 | 0.4000 | 1.54 | 55.7 | −99.0000 |
| S14 | aspheric | 1.7573 | 0.2048 | | | −11.2776 |
| S15 | spherical | infinite | 0.1100 | 1.52 | 64.2 | |
| S16 | spherical | infinite | 0.5500 | | | |
| S17 | spherical | infinite | | | | |

As can be seen from Table 4, in embodiment 2, the object-side surface and the image-side surface of any one of the first lens E1 to the seventh lens E7 are aspheric. Table 5 shows high-order coefficients applicable to each aspheric surface in embodiment 2, wherein the surface shape of each aspheric surface can be defined by the formula (1) given in the above embodiment 1.

TABLE 5

| Surface number | A4 | A6 | A8 | A10 | A12 |
|---|---|---|---|---|---|
| S1 | 3.1815E−02 | −1.0304E−02 | 2.3436E−02 | −3.7100E−02 | 3.1027E−02 |
| S2 | 5.1660E−02 | −2.9606E−02 | −5.8208E−03 | 8.0132E−04 | −9.1835E−03 |
| S3 | −5.6612E−02 | 7.0791E−02 | −1.1791E−01 | 1.1695E−01 | −8.2723E−02 |
| S4 | −6.7237E−02 | 1.0082E−01 | −1.6357E−01 | 1.9435E−01 | −1.4585E−01 |
| S5 | −5.3132E−02 | 4.7346E−02 | −1.1351E−01 | 1.5878E−01 | −1.3286E−01 |
| S6 | −1.7317E−02 | −1.9763E−02 | 2.9531E−02 | −5.1333E−02 | 4.0373E−02 |
| S7 | −1.1284E−01 | 2.1558E−01 | −1.0334E+00 | 2.7748E+00 | −4.5968E+00 |
| S8 | −1.3293E−01 | 2.3729E−01 | −6.7561E−01 | 1.1239E+00 | −1.2111E+00 |
| S9 | −1.0916E−01 | 2.2061E−01 | −2.6537E−01 | 9.2332E−02 | 6.7617E−02 |
| S10 | −1.3171E−01 | 9.9427E−03 | 2.9318E−01 | −5.1480E−01 | 4.3184E−01 |
| S11 | 3.4764E−02 | 4.0438E−01 | 5.3891E−01 | −4.4897E−01 | 2.3874E−01 |
| S12 | 2.2981E−01 | 4.8997E−01 | 4.7860E−01 | −3.1048E−01 | 1.3575E−01 |
| S13 | −2.1915E−01 | 8.8856E−02 | −1.4960E−02 | 9.5811E−04 | −7.0391E−07 |
| S14 | −1.2144E−01 | 5.6643E−02 | −1.9252E−02 | 5.0012E−03 | −9.8372E−04 |

| Surface number | A14 | A16 | A18 | A20 |
|---|---|---|---|---|
| S1 | −1.5060E−02 | 3.6816E−03 | −3.3912E−04 | 0.0000E+00 |
| S2 | 1.5572E−02 | −7.5904E−03 | 1.2197E−03 | 0.0000E+00 |
| S3 | 4.5156E−02 | −1.4899E−02 | 2.0488E−03 | 0.0000E+00 |
| S4 | 7.1374E−02 | −1.9040E−02 | 1.7514E−03 | 0.0000E+00 |
| S5 | 5.9562E−02 | −7.5857E−03 | −1.8530E−03 | 0.0000E+00 |
| S6 | −1.0477E−02 | −2.1182E−03 | 8.9163E−04 | 0.0000E+00 |
| S7 | 4.7754E+00 | −2.9994E+00 | 1.0409E+00 | −1.5397E−01 |
| S8 | 8.7190E−01 | −3.8851E−01 | 9.4610E−02 | −9.5469E−03 |
| S9 | −8.7982E−02 | 4.5372E−02 | −1.3040E−02 | 1.6692E−03 |
| S10 | −2.0628E−01 | 5.7313E−02 | −8.6643E−03 | 5.5333E−04 |
| S11 | −7.9475E−02 | 1.5968E−02 | −1.7467E−03 | 7.7659E−05 |
| S12 | −3.8757E−02 | 6.8524E−03 | −6.7593E−04 | 2.8296E−05 |
| S13 | 6.8428E−06 | −1.6131E−06 | 6.2754E−08 | 1.8645E−09 |
| S14 | 1.2934E−04 | −9.8141E−06 | 3.5013E−07 | −3.2124E−09 |

Table 6 shows the effective focal length f1 to f7 of respective lens, the total effective focal length f of the optical imaging system, the distance TTL on the optical axis from the object-side surface S1 of the first lens E1 to the imaging plane S17 and half of the diagonal length ImgH of an effective pixel area on the imaging plane S17 in embodiment 2.

TABLE 6

| f1 (mm) | 5.86 | f6 (mm) | 6.69 |
|---|---|---|---|
| f2 (mm) | −7.39 | f7 (mm) | −3.44 |
| f3 (mm) | 4.39 | f (mm) | 4.24 |
| f4 (mm) | −23.31 | TTL (mm) | 5.08 |
| f5 (mm) | 148.68 | ImgH (mm) | 3.65 |

Figure 4A:
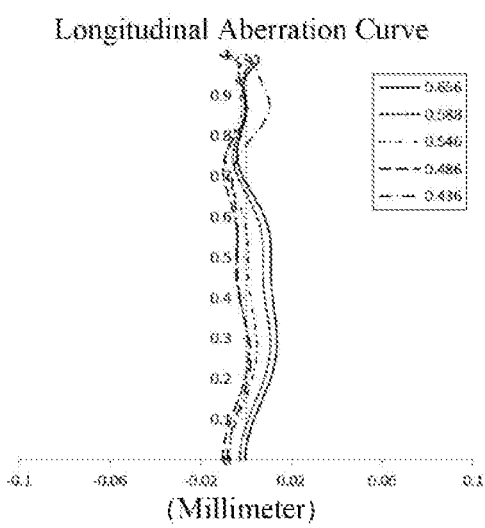
FIGS. 4A to 4D illustrate a longitudinal aberration curve, an astigmatic curve, a distortion curve and a lateral color curve of the optical imaging system of the embodiment 2, respectively.
Figure 4B:
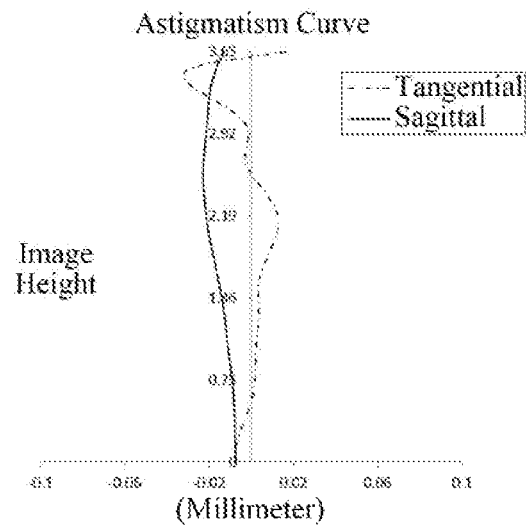
Figure 4C:
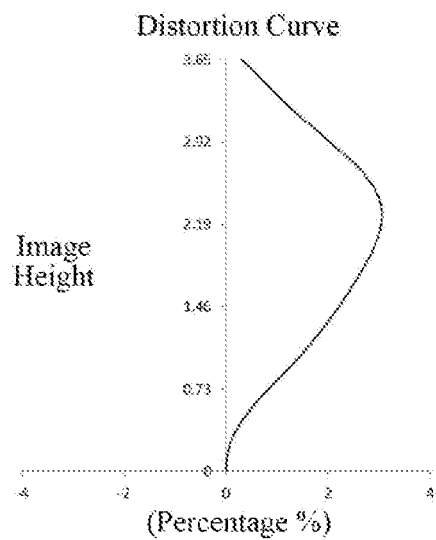
Figure 4D:
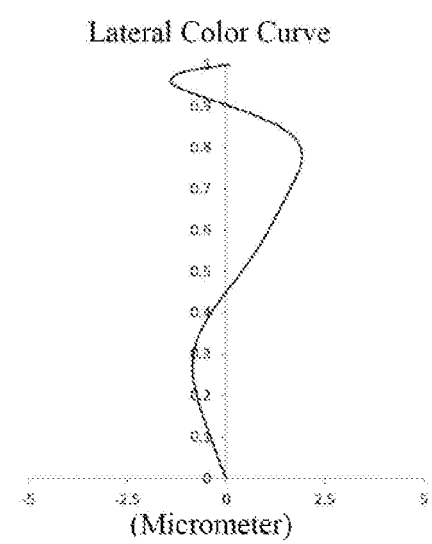

FIG. 4A illustrates a longitudinal aberration curve of the optical imaging system according to embodiment 2, representing deviations of focal points converged by light of different wavelengths after passing through the optical imaging system. FIG. 4B illustrates an astigmatism curve of the optical imaging system according to embodiment 2, representing a curvature of a tangential plane and a curvature of a sagittal plane. FIG. 4C illustrates a distortion curve of the optical imaging system according to embodiment 2, representing amounts of distortion at different field of view. FIG. 4D illustrates a lateral color curve of the optical imaging system according to embodiment 2, representing deviations of different image heights on an imaging plane after light passes through the optical imaging system. It can be seen from FIG. 4A to FIG. 4D that the optical imaging system provided in embodiment 2 can achieve good image quality.

Embodiment 3

Figure 5:
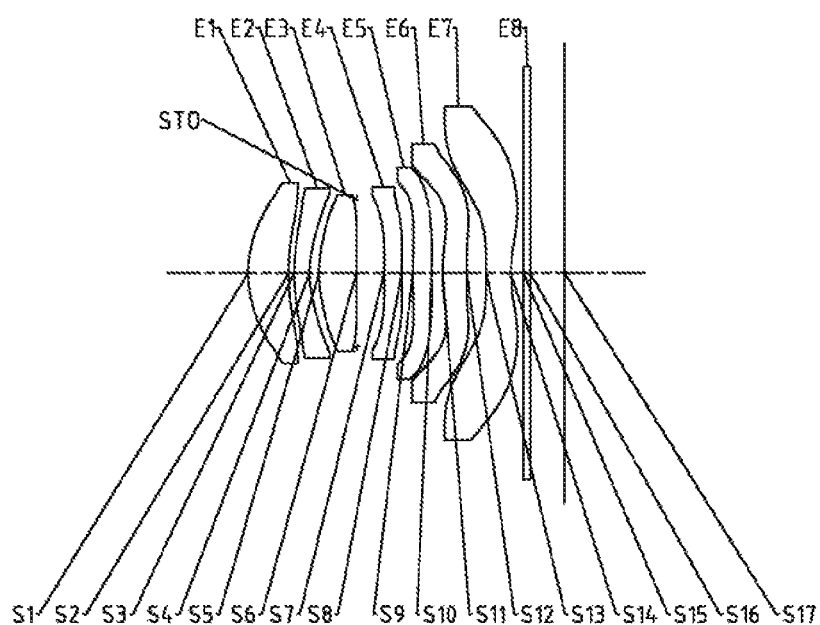
FIG. 5 illustrates a schematic structural view of an optical imaging system according to embodiment 3 of the present disclosure.

An optical imaging system according to embodiment 3 of the present disclosure is described below with reference to FIG. 5 to FIG. 6D. FIG. 5 is a schematic structural view of the optical imaging system according to embodiment 3 of the present disclosure.

As shown in FIG. 5, the optical imaging system according to an exemplary implementation of the present disclosure includes a first lens E1, a second lens E2, a third lens E3, a diaphragm STO, a fourth lens E4, a fifth lens E5, a sixth lens E6, a seventh lens E7, an optical filter E8 and an imaging plane S17, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a concave surface. The sixth lens E6 has a positive refractive power. An object-side surface S11 of the sixth lens E6 is a convex surface, and an image-side surface S12 of the sixth lens E6 is a concave surface. The seventh lens E7 has a negative refractive power. An object-side surface S13 of the seventh lens E7 is a convex surface, and an image-side surface S14 of the seventh lens E7 is a concave surface. The optical filter E8 has an object-side surface S15 and an image-side surface S16. Light from an object sequentially passes through the respective surfaces S1 to S16 and is finally imaged on the imaging plane S17.

Table 7 shows surface type, radius of curvature, thickness, material and conic coefficient of each lens of the optical imaging system in embodiment 3, wherein the units for the radius of curvature and the thickness are millimeter (mm).

TABLE 7

| Surface number | Surface type | Radius of curvature | Thickness | Material | | Conic coefficient |
|---|---|---|---|---|---|---|
| | | | | Refractive index | Abbe number | |
| OBJ | spherical | infinite | infinite | | | |
| S1 | aspheric | 1.9357 | 0.6514 | 1.55 | 64.1 | −1.7870 |
| S2 | aspheric | 4.1661 | 0.0860 | | | −21.8882 |
| S3 | aspheric | 2.9037 | 0.2500 | 1.67 | 20.4 | −6.0432 |
| S4 | aspheric | 1.7838 | 0.1513 | | | −4.0054 |
| S5 | aspheric | 2.2911 | 0.5964 | 1.55 | 64.1 | 0.4152 |
| S6 | aspheric | 30.0110 | 0.0068 | | | 3.0846 |
| STO | spherical | infinite | 0.4421 | | | |
| S7 | aspheric | 99.9217 | 0.2817 | 1.67 | 20.4 | −99.0000 |
| S8 | aspheric | 14.2946 | 0.1805 | | | −86.3621 |
| S9 | aspheric | 11.6584 | 0.3020 | 1.65 | 23.5 | −21.6923 |
| S10 | aspheric | 14.1702 | 0.1755 | | | −32.1794 |
| S11 | aspheric | 3.5259 | 0.3836 | 1.55 | 64.1 | −3.2011 |
| S12 | aspheric | 58.6395 | 0.3110 | | | 5.0000 |
| S13 | aspheric | 42.5598 | 0.4000 | 1.54 | 55.7 | −73.6319 |
| S14 | aspheric | 1.7868 | 0.2025 | | | −11.2413 |
| S15 | spherical | infinite | 0.1100 | 1.52 | 64.2 | |
| S16 | spherical | infinite | 0.5500 | | | |
| S17 | spherical | infinite | | | | |

As can be seen from Table 7, in embodiment 3, the object-side surface and the image-side surface of any one of the first lens E1 to the seventh lens E7 are aspheric. Table 8 below shows high-order coefficients applicable to each aspheric surface in embodiment 3, wherein the surface shape of each aspheric surface can be defined by the formula (1) given in the above embodiment 1.

TABLE 8

| Surface number | A4 | A6 | A8 | A10 | A12 |
|---|---|---|---|---|---|
| S1 | 3.1388E−02 | −1.0679E−02 | 2.3400E−02 | −3.7089E−02 | 3.1034E−02 |
| S2 | 4.9337E−02 | −2.5941E−02 | −4.4970E−03 | −1.6425E−02 | 1.8080E−02 |
| S3 | −5.9765E−02 | 8.5087E−02 | −1.2368E−01 | 8.9709E−02 | −3.8520E−02 |
| S4 | −6.9651E−02 | 1.1705E−01 | −1.6785E−01 | 1.5375E−01 | −8.1819E−02 |
| S5 | −5.4845E−02 | 3.5266E−02 | −4.2770E−02 | 9.8134E−03 | 3.6391E−02 |
| S6 | −2.0034E−02 | −1.1883E−03 | −3.1817E−02 | 7.2854E−02 | −1.1287E−01 |
| S7 | −1.1247E−01 | 1.9841E−01 | −9.2364E−01 | 2.4616E+00 | −4.1383E+00 |
| S8 | −1.2551E−01 | 1.7982E−01 | −4.3102E−01 | 5.7986E−01 | −4.9239E−01 |
| S9 | −1.0940E−01 | 1.5924E−01 | −6.9997E−02 | −2.2676E−01 | 3.9617E−01 |
| S10 | −1.2907E−01 | −3.4821E−02 | 3.9734E−01 | −6.4031E−01 | 5.2073E−01 |
| S11 | 3.3712E−02 | −4.0827E−01 | 5.5766E−01 | −4.6758E−01 | 2.4486E−01 |
| S12 | 2.1558E−01 | −4.6712E−01 | 4.6557E−01 | −3.0827E−01 | 1.3722E−01 |
| S13 | −2.1986E−01 | 8.8808E−02 | −1.4961E−02 | 9.5882E−04 | −5.1095E−07 |
| S14 | −1.2308E−01 | 5.8634E−02 | −2.1248E−02 | 5.8532E−03 | −1.1754E−03 |

| Surface number | A14 | A16 | A18 | A20 |
|---|---|---|---|---|
| S1 | −1.5058E−02 | 3.6829E−03 | −3.3825E−04 | 0.0000E+00 |
| S2 | −3.5192E−03 | −1.2271E−03 | 3.9276E−04 | 0.0000E+00 |
| S3 | 1.5635E−02 | −5.3762E−03 | 8.2316E−04 | 0.0000E+00 |
| S4 | 2.6027E−02 | −2.4107E−03 | −8.2058E−04 | 0.0000E+00 |
| S5 | −5.2230E−02 | 3.3206E−02 | −8.1611E−03 | 0.0000E+00 |
| S6 | 9.9119E−02 | −4.3271E−02 | 7.1373E−03 | 0.0000E+00 |
| S7 | 4.4124E+00 | −2.8643E+00 | 1.0337E+00 | −1.5991E−01 |
| S8 | 2.7901E−01 | −9.0528E−02 | 1.1732E−02 | 1.8923E−04 |
| S9 | −3.1870E−01 | 1.5369E−01 | −4.3462E−02 | 5.4658E−03 |
| S10 | −2.4417E−01 | 6.6699E−02 | −9.8834E−03 | 6.1543E−04 |
| S11 | −7.8855E−02 | 1.4993E−02 | −1.4926E−03 | 5.5203E−05 |
| S12 | −3.9958E−02 | 7.2460E−03 | −7.3882E−04 | 3.2265E−05 |
| S13 | 6.8755E−06 | −1.6097E−06 | 6.2634E−08 | 1.6781E−09 |
| S14 | 1.5441E−04 | −1.1767E−05 | 4.3756E−07 | −5.0487E−09 |

Table 9 shows the effective focal length f1 to f7 of respective lens, the total effective focal length f of the optical imaging system, the distance TTL on the optical axis from the object-side surface S1 of the first lens E1 to the imaging plane S17 and half of the diagonal length ImgH of an effective pixel area on the imaging plane S17 in embodiment 3.

TABLE 9

| f1 (mm) | 6.00 | f6 (mm) | 6.85 |
|---|---|---|---|
| f2 (mm) | −7.62 | f7 (mm) | −3.49 |
| f3 (mm) | 4.51 | f (mm) | 4.26 |
| f4 (mm) | −25.06 | TTL (mm) | 5.08 |
| f5 (mm) | 97.44 | ImgH (mm) | 3.65 |

Figure 6A:
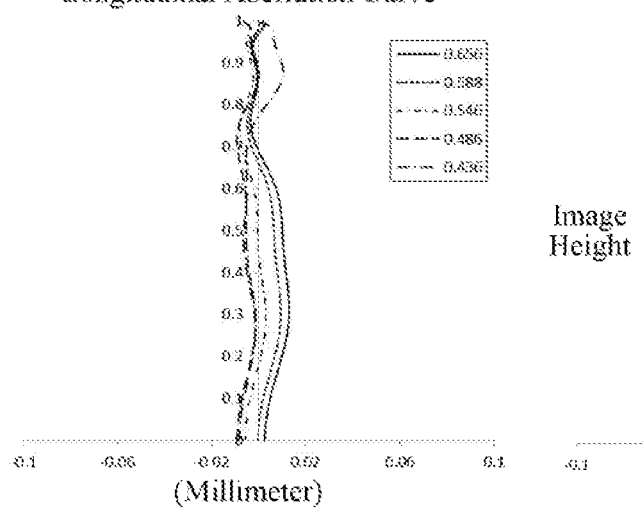
FIGS. 6A to 6D illustrate a longitudinal aberration curve, an astigmatic curve, a distortion curve and a lateral color curve of the optical imaging system of the embodiment 3, respectively.
Figure 6B:
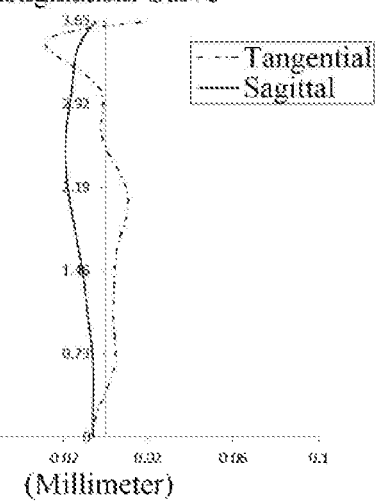
Figures 6C, 6D:
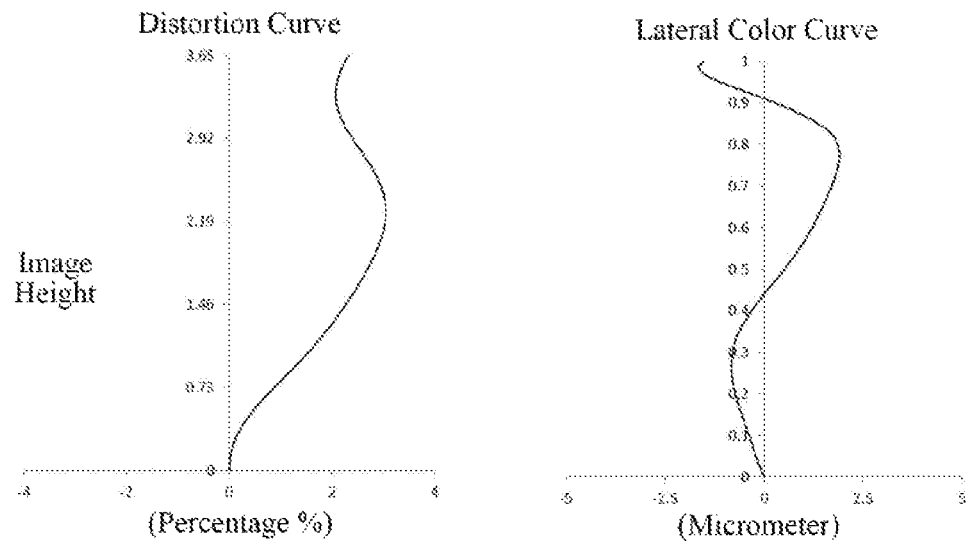

FIG. 6A illustrates a longitudinal aberration curve of the optical imaging system according to embodiment 3, representing deviations of focal points converged by light of different wavelengths after passing through the optical imaging system. FIG. 6B illustrates an astigmatism curve of the optical imaging system according to embodiment 3, representing a curvature of a tangential plane and a curvature of a sagittal plane. FIG. 6C illustrates a distortion curve of the optical imaging system according to embodiment 3, representing amounts of distortion at different field of view. FIG. 6D illustrates a lateral color curve of the optical imaging system according to embodiment 3, representing deviations of different image heights on an imaging plane after light passes through the optical imaging system. It can be seen from FIG. 6A to FIG. 6D that the optical imaging system provided in embodiment 3 can achieve good image quality.

Embodiment 4

Figure 7:
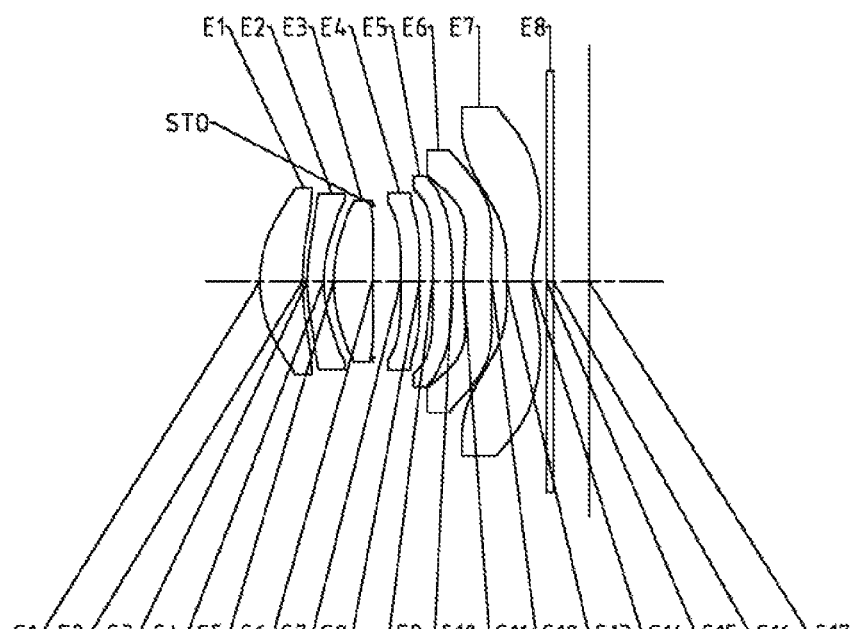
FIG. 7 illustrates a schematic structural view of an optical imaging system according to embodiment 4 of the present disclosure.

An optical imaging system according to embodiment 4 of the present disclosure is described below with reference to FIG. 7 to FIG. 8D. FIG. 7 is a schematic structural view of the optical imaging system according to embodiment 4 of the present disclosure.

As shown in FIG. 7, the optical imaging system according to an exemplary implementation of the present disclosure includes a first lens E1, a second lens E2, a third lens E3, a diaphragm STO, a fourth lens E4, a fifth lens E5, a sixth lens E6, a seventh lens E7, an optical filter E8 and an imaging plane S17, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a convex surface. The sixth lens E6 has a positive refractive power. An object-side surface S11 of the sixth lens E6 is a convex surface, and an image-side surface S12 of the sixth lens E6 is a convex surface. The seventh lens E7 has a negative refractive power. An object-side surface S13 of the seventh lens E7 is a convex surface, and an image-side surface S14 of the seventh lens E7 is a concave surface. The optical filter E8 has an object-side surface S15 and an image-side surface S16. Light from an object sequentially passes through the respective surfaces S1 to S16 and is finally imaged on the imaging plane S17.

Table 10 shows surface type, radius of curvature, thickness, material and conic coefficient of each lens of the optical imaging system in embodiment 4, wherein the units for the radius of curvature and the thickness are millimeter (mm).

TABLE 10

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 | aspheric | 1.9378 | 0.6578 | 1.55 | 64.1 | −1.7810 |
| S2 | aspheric | 4.3372 | 0.0752 | | | −23.4850 |
| S3 | aspheric | 2.9414 | 0.2500 | 1.67 | 20.4 | −6.0037 |
| S4 | aspheric | 1.7626 | 0.1549 | | | −3.8976 |
| S5 | aspheric | 2.2075 | 0.6030 | 1.55 | 64.1 | 0.4436 |
| S6 | aspheric | 21.0150 | 0.0024 | | | 5.0000 |
| STO | spherical | infinite | 0.4315 | | | |
| S7 | aspheric | 133.6915 | 0.2889 | 1.67 | 20.4 | −99.0000 |
| S8 | aspheric | 26.4736 | 0.2055 | | | 5.0000 |
| S9 | aspheric | 48.5885 | 0.3000 | 1.55 | 64.1 | 5.0000 |
| S10 | aspheric | −100.3870 | 0.1721 | | | 5.0000 |
| S11 | aspheric | 4.9110 | 0.4348 | 1.55 | 64.1 | −4.3438 |
| S12 | aspheric | −17.4671 | 0.2317 | | | −99.0000 |
| S13 | aspheric | 48.7535 | 0.4000 | 1.54 | 55.7 | 5.0000 |
| S14 | aspheric | 1.6484 | 0.2134 | | | −10.6627 |
| S15 | spherical | infinite | 0.1100 | 1.52 | 64.2 | |
| S16 | spherical | infinite | 0.5500 | | | |
| S17 | spherical | infinite | | | | |

As can be seen from Table 10, in embodiment 4, the object-side surface and the image-side surface of any one of the first lens E1 to the seventh lens E7 are aspheric. Table 11 below shows high-order coefficients applicable to each aspheric surface in embodiment 4, wherein the surface shape of each aspheric surface can be defined by the formula (1) given in the above embodiment 1.

TABLE 11

| Surface number | A4 | A6 | A8 | A10 | A12 |
|---|---|---|---|---|---|
| S1 | 3.1250E−02 | −1.0809E−02 | 2.3401E−02 | −3.7078E−02 | 3.1038E−02 |
| S2 | 4.7819E−02 | −1.6514E−02 | −2.3399E−02 | −3.5107E−03 | 1.7796E−02 |
| S3 | −6.5170E−02 | 1.1197E−01 | −1.7783E−01 | 1.5133E−01 | −8.0397E−02 |
| S4 | −7.6752E−02 | 1.4527E−01 | −2.2411E−01 | 2.3451E−01 | −1.5590E−01 |
| S5 | −5.7412E−02 | 4.1490E−02 | −4.7878E−02 | 9.3743E−03 | 4.7390E−02 |
| S6 | −1.7824E−02 | −4.0785E−04 | −4.2148E−02 | 9.9187E−02 | −1.4911E−01 |
| S7 | −1.0762E−01 | 1.7400E−01 | −8.5716E−01 | 2.3415E+00 | −4.0457E+00 |
| S8 | −1.1290E−01 | 1.4079E−01 | −3.8336E−01 | 5.8452E−01 | −5.8695E−01 |
| S9 | −8.8023E−02 | 9.6116E−02 | 2.0643E−02 | −3.3076E−01 | 4.9289E−01 |
| S10 | −1.0789E−01 | −1.1010E−01 | 4.8300E−01 | −6.4967E−01 | 4.3321E−01 |
| S11 | 2.6126E−02 | −3.8692E−02 | 4.9580E−02 | −3.5439E−01 | 1.3255E−01 |
| S12 | 2.1798E−01 | −4.6746E−01 | 4.5109E−01 | −2.8074E−01 | 1.1446E−01 |
| S13 | −2.2087E−01 | 8.8758E−02 | −1.4959E−02 | 9.6019E−04 | −1.9872E−07 |
| S14 | −1.2872E−01 | 6.8184E−02 | −2.5193E−02 | 6.4718E−03 | −1.1382E−03 |

| Surface number | A14 | A16 | A18 | A20 |
|---|---|---|---|---|
| S1 | −1.5056E−02 | 3.6833E−03 | −3.3808E−04 | 0.0000E+00 |
| S2 | −7.1713E−03 | 4.2622E−04 | 1.5936E−04 | 0.0000E+00 |
| S3 | 3.2299E−02 | −8.9499E−03 | 1.1403E−03 | 0.0000E+00 |
| S4 | 6.6220E−02 | −1.4625E−02 | 8.4677E−04 | 0.0000E+00 |
| S5 | −6.7056E−02 | 4.0822E−02 | −9.4912E−03 | 0.0000E+00 |
| S6 | 1.2541E−01 | −5.2521E−02 | 8.3649E−03 | 0.0000E+00 |
| S7 | 4.4196E+00 | −2.9252E+00 | 1.0733E+00 | −1.6864E−01 |
| S8 | 4.0211E−01 | −1.6300E−01 | 3.2310E−02 | −2.0883E−03 |
| S9 | −4.0265E−01 | 2.1337E−01 | −6.8040E−02 | 9.5079E−03 |
| S10 | −1.4487E−01 | 1.7796E−02 | 1.7263E−03 | −4.6758E−04 |
| S11 | −1.8060E−02 | −3.1982E−03 | 1.3537E−03 | −1.2747E−04 |
| S12 | −2.9949E−02 | 4.8076E−03 | −4.2763E−04 | 1.6012E−05 |
| S13 | 6.9251E−06 | −1.6053E−06 | 6.1990E−08 | 1.2297E−09 |
| S14 | 1.2711E−04 | −7.9812E−06 | 2.1928E−07 | −6.4110E−10 |

Table 12 shows the effective focal length f1 to f7 of respective lens, the total effective focal length f of the optical imaging system, the distance TTL on the optical axis from the object-side surface S1 of the first lens E1 to the imaging plane S17 and half of the diagonal length ImgH of an effective pixel area on the imaging plane S17 in embodiment 4.

TABLE 12

| | | | |
|---|---|---|---|
| f1 (mm) | 5.85 | f6 (mm) | 7.07 |
| f2 (mm) | −7.21 | f7 (mm) | −3.19 |
| f3 (mm) | 4.47 | f (mm) | 4.26 |
| f4 (mm) | −49.59 | TTL (mm) | 5.08 |
| f5 (mm) | 60.01 | ImgH (mm) | 3.65 |

Figure 8A:
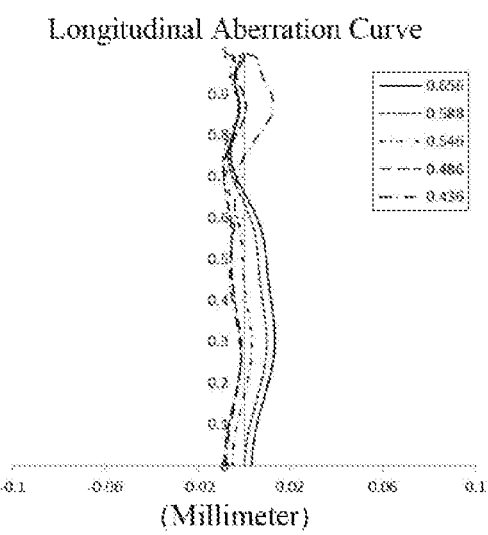
FIGS. 8A to 8D illustrate a longitudinal aberration curve, an astigmatic curve, a distortion curve and a lateral color curve of the optical imaging system of the embodiment 4, respectively.
Figure 8B:
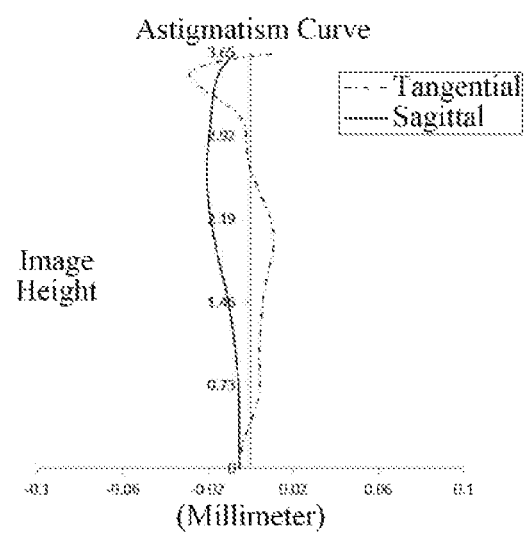
Figure 8C:
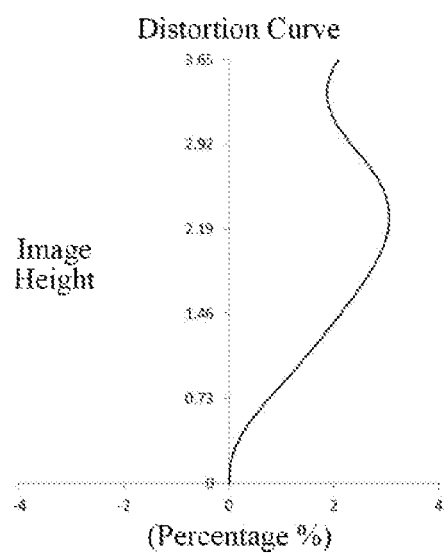
Figure 8D:
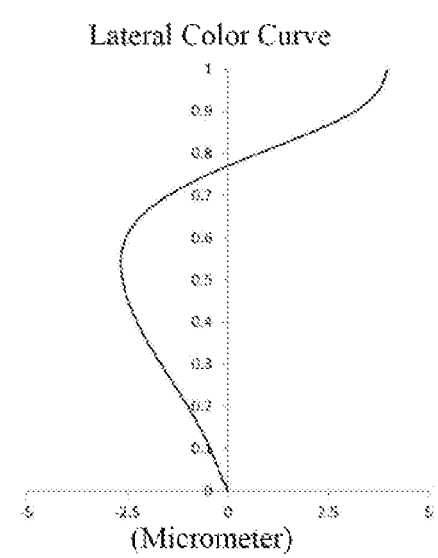

FIG. 8A illustrates a longitudinal aberration curve of the optical imaging system according to embodiment 4, representing deviations of focal points converged by light of different wavelengths after passing through the optical imaging system. FIG. 8B illustrates an astigmatism curve of the optical imaging system according to embodiment 4, representing a curvature of a tangential plane and a curvature of a sagittal plane. FIG. 8C illustrates a distortion curve of the optical imaging system according to embodiment 4, representing amounts of distortion at different filed of view. FIG. 8D illustrates a lateral color curve of the optical imaging system according to embodiment 4, representing deviations of different image heights on an imaging plane after light passes through the optical imaging system. It can be seen from FIG. 8A to FIG. 8D that the optical imaging system provided in embodiment 4 can achieve good image quality.

Embodiment 5

Figure 9:
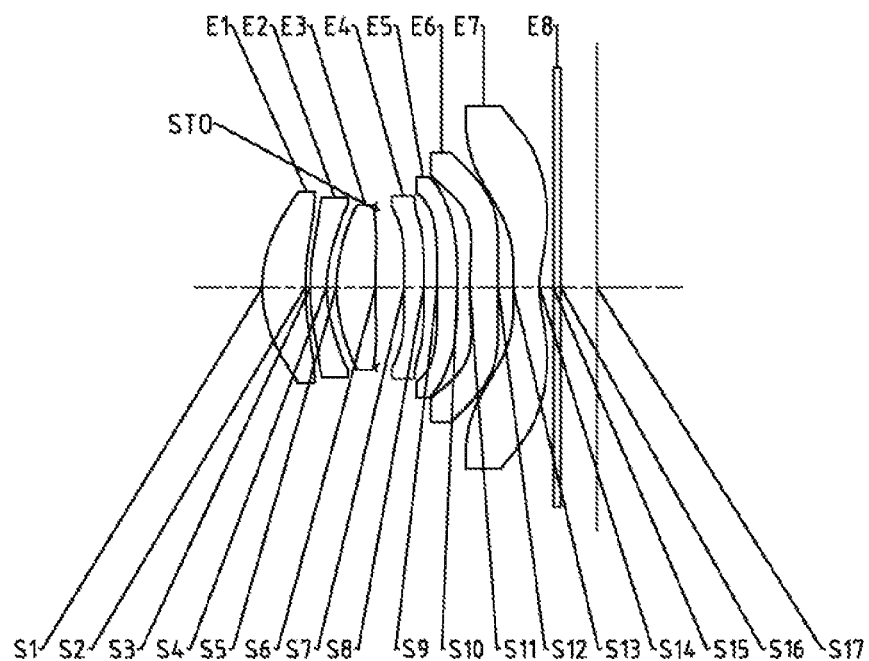
FIG. 9 illustrates a schematic structural view of an optical imaging system according to embodiment 5 of the present disclosure.

An optical imaging system according to embodiment 5 of the present disclosure is described below with reference to FIG. 9 to FIG. 10D. FIG. 9 is a schematic structural view of the optical imaging system according to embodiment 5 of the present disclosure.

As shown in FIG. 9, the optical imaging system according to an exemplary implementation of the present disclosure includes a first lens E1, a second lens E2, a third lens E3, a diaphragm STO, a fourth lens E4, a fifth lens E5, a sixth lens E6, a seventh lens E7, an optical filter E8 and an imaging plane S17, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a convex surface. The sixth lens E6 has a positive refractive power. An object-side surface S11 of the sixth lens E6 is a convex surface, and an image-side surface S12 of the sixth lens E6 is a convex surface. The seventh lens E7 has a negative refractive power. An object-side surface S13 of the seventh lens E7 is a convex surface, and an image-side surface S14 of the seventh lens E7 is a concave surface. The optical filter E8 has an object-side surface S15 and an image-side surface S16. Light from an object sequentially passes through the respective surfaces S1 to S16 and is finally imaged on the imaging plane S17.

Table 13 shows surface type, radius of curvature, thickness, material and conic coefficient of each lens of the optical imaging system in embodiment 5, wherein the units for the radius of curvature and the thickness are millimeter (mm).

TABLE 13

| Surface number | Surface type | Radius of curvature | Thickness | Material Refractive index | Material Abbe number | Conic coefficient |
|---|---|---|---|---|---|---|
| OBJ | spherical | infinite | infinite | | | |
| S1 | aspheric | 1.9431 | 0.6550 | 1.55 | 64.1 | −1.7815 |
| S2 | aspheric | 4.3309 | 0.0718 | | | −23.8555 |
| S3 | aspheric | 2.8783 | 0.2500 | 1.67 | 20.4 | −5.9481 |
| S4 | aspheric | 1.7496 | 0.1495 | | | −3.9068 |
| S5 | aspheric | 2.2089 | 0.5942 | 1.55 | 64.1 | 0.4465 |
| S6 | aspheric | 20.6954 | 0.0095 | | | 5.0000 |
| STO | spherical | infinite | 0.4242 | | | |
| S7 | aspheric | 86.9453 | 0.2946 | 1.67 | 20.4 | 5.0000 |
| S8 | aspheric | 28.3541 | 0.2079 | | | 5.0000 |
| S9 | aspheric | 132.9243 | 0.3060 | 1.55 | 64.1 | −99.0000 |
| S10 | aspheric | −41.8320 | 0.1865 | | | −99.0000 |
| Sil | aspheric | 6.5081 | 0.4307 | 1.67 | 20.4 | 0.4500 |
| S12 | aspheric | −15.7338 | 0.2277 | | | −2.5539 |
| S13 | aspheric | 50.0000 | 0.4000 | 1.54 | 55.7 | −99.0000 |
| S14 | aspheric | 1.6178 | 0.2131 | | | −10.6804 |
| S15 | spherical | infinite | 0.1100 | 1.52 | 64.2 | |
| S16 | spherical | infinite | 0.5500 | | | |
| S17 | spherical | infinite | | | | |

As can be seen from Table 13, in embodiment 5, the object-side surface and the image-side surface of any one of the first lens E1 to the seventh lens E7 are aspheric. Table 14 below shows high-order coefficients applicable to each aspheric surface in embodiment 5, wherein the surface shape of each aspheric surface can be defined by the formula (1) given in the above embodiment 1.

TABLE 14

| Surface number | A4 | A6 | A8 | A10 | A12 |
|---|---|---|---|---|---|
| S1 | 3.1141E−02 | −1.0900E−02 | 2.3381E−02 | −3.7081E−02 | 3.1037E−02 |
| S2 | 4.6405E−02 | −9.9598E−03 | 4.1090E−02 | 2.3217E−02 | −5.2735E−03 |
| S3 | −6.6446E−02 | 1.1912E−01 | −1.9737E−01 | 1.8310E−01 | −1.1119E−01 |
| S4 | −7.7407E−02 | 1.5333E−01 | −2.5259E−01 | 2.8964E−01 | −2.2084E−01 |
| S5 | −5.7919E−02 | 4.6985E−02 | −6.5762E−02 | 4.2052E−02 | 1.0748E−02 |
| S6 | −1.6992E−01 | −4.4736E−04 | 4.2020E−02 | 9.8415E−02 | −1.4766E−01 |
| S7 | −1.0460E−01 | 1.6313E−01 | −7.9292E−01 | 2.1187E+00 | −3.6129E+00 |
| S8 | −1.1377E−01 | 1.4915E−01 | −3.9874E−01 | 5.9601E−01 | −5.9655E−01 |
| S9 | −9.7193E−02 | 1.2392E−01 | −2.0699E−02 | −2.6312E−01 | 3.9061E−01 |
| S10 | −1.0439E−01 | −1.1760E−01 | 5.0572E−01 | −6.6472E−01 | 4.2213E−01 |
| S11 | 3.9282E−02 | −3.7362E−01 | 4.6253E−01 | −3.0987E−01 | 9.5150E−02 |
| S12 | 2.0284E−01 | −4.4038E−01 | 4.3135E−01 | −2.6935E−01 | 1.0815E−01 |
| S13 | −2.2148E−01 | 8.8737E−02 | −1.4957E−02 | 9.6090E−04 | −3.8364E−08 |
| S14 | −1.3296E−01 | 7.4088E−02 | −2.9552E−02 | 8.3264E−03 | −1.6049E−03 |

| Surface number | A14 | A16 | A18 | A20 |
|---|---|---|---|---|
| S1 | −1.5057E−02 | 3.6832E−03 | −3.3805E−04 | 0.0000E+00 |
| S2 | 4.3254E−03 | −2.6837E−03 | 5.1413E−04 | 0.0000E+00 |
| S3 | 4.9827E−02 | −1.4376E−02 | 1.8465E−03 | 0.0000E+00 |
| S4 | 1.1130E−01 | −3.1395E−02 | 3.4134E−03 | 0.0000E+00 |
| S5 | −4.2929E−02 | 3.2566E−02 | −8.4049E−03 | 0.0000E+00 |
| S6 | 1.2422E−01 | −5.1949E−02 | 8.2216E−03 | 0.0000E+00 |
| S7 | 3.9140E+00 | −2.5721E+00 | 9.3836E−01 | −1.4705E−01 |
| S8 | 4.0891E−01 | −1.6358E−01 | 3.1003E−02 | −1.7201E−03 |
| S9 | −3.0983E−01 | 1.6752E−01 | −5.6490E−02 | 8.3358E−03 |
| S10 | −1.2610E−01 | 8.2548E−03 | 3.9186E−03 | −6.6211E−04 |
| S11 | 3.2982E−04 | −8.3201E−03 | 2.0982E−03 | −1.7093E−04 |
| S12 | −2.7414E−02 | 4.2032E−03 | −3.5227E−04 | 1.2233E−05 |
| S13 | 6.9523E−06 | −1.6026E−06 | 6.1700E−08 | 9.9005E−10 |
| S14 | 1.9740E−04 | −1.4212E−05 | 5.2008E−07 | −6.7688E−09 |

Table 15 shows the effective focal length f1 to f7 of respective lens, the total effective focal length f of the optical imaging system, the distance TTL on the optical axis from the object-side surface S1 of the first lens E1 to the imaging plane S17 and half of the diagonal length ImgH of an effective pixel area on the imaging plane S17 in embodiment 5.

TABLE 15

| f1 (mm) | 5.89 | f6 (mm) | 6.97 |
|---|---|---|---|
| f2 (mm) | −7.35 | f7 (mm) | −3.12 |
| f3 (mm) | 4.48 | f (mm) | 4.23 |
| f4 (mm) | −63.33 | TTL (mm) | 5.08 |
| f5 (mm) | 58.32 | ImgH (mm) | 3.65 |

Figure 10A:
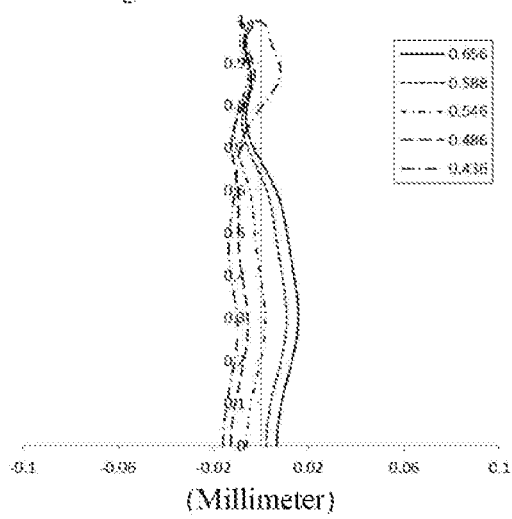
FIGS. 10A to 10D illustrate a longitudinal aberration curve, an astigmatic curve, a distortion curve and a lateral color curve of the optical imaging system of the embodiment 5, respectively.
Figure 10B:
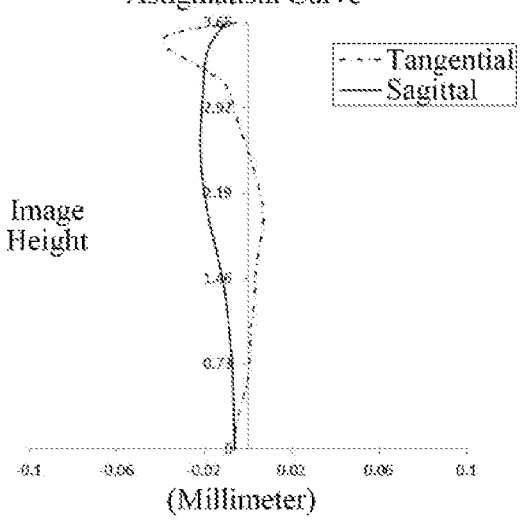
Figure 10C:
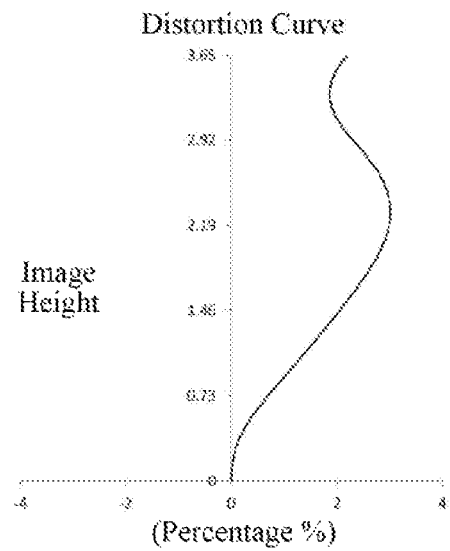
Figure 10D:
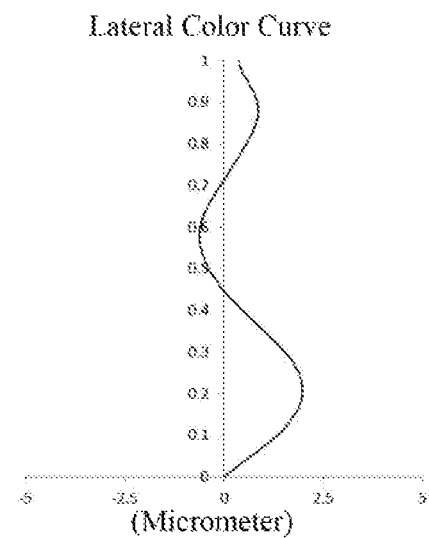

FIG. 10A illustrates a longitudinal aberration curve of the optical imaging system according to embodiment 5, representing deviations of focal points converged by light of different wavelengths after passing through the optical imaging system. FIG. 10B illustrates an astigmatism curve of the optical imaging system according to embodiment 5, representing a curvature of a tangential plane and a curvature of a sagittal plane. FIG. 10C illustrates a distortion curve of the optical imaging system according to embodiment 5, representing amounts of distortion at different field of view. FIG. 10D illustrates a lateral color curve of the optical imaging system according to embodiment 5, representing deviations of different image heights on an imaging plane after light passes through the optical imaging system. It can be seen from FIG. 10A to FIG. 10D that the optical imaging system provided in embodiment 5 can achieve good image quality.

Embodiment 6

Figure 11:
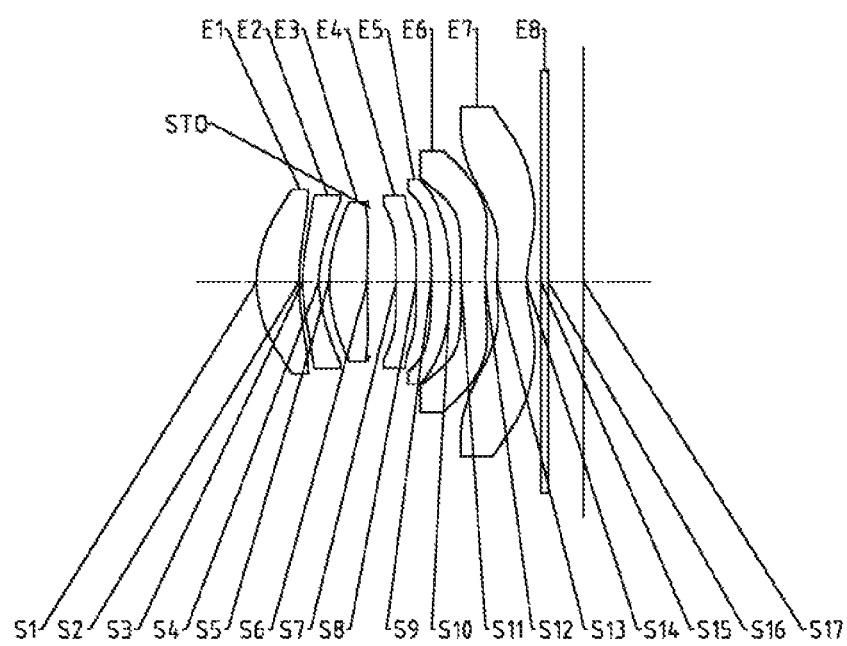
FIG. 11 illustrates a schematic structural view of an optical imaging system according to embodiment 6 of the present disclosure.

An optical imaging system according to embodiment 6 of the present disclosure is described below with reference to FIG. 11 to FIG. 12D. FIG. 11 is a schematic structural view of the optical imaging system according to embodiment 6 of the present disclosure.

As shown in FIG. 11, the optical imaging system according to an exemplary implementation of the present disclosure includes a first lens E1, a second lens E2, a third lens E3, a diaphragm STO, a fourth lens E4, a fifth lens E5, a sixth lens E6, a seventh lens E7, an optical filter E8 and an imaging plane S17, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a concave surface, and an image-side surface S8 of the fourth lens E4 is a concave surface. The fifth lens E5 has a positive refractive power. An object-side surface S9 of the fifth lens E5 is a concave surface, and an image-side surface S10 of the fifth lens E5 is a convex surface. The sixth lens E6 has a negative refractive power. An object-side surface S11 of the sixth lens E6 is a concave surface, and an image-side surface S12 of the sixth lens E6 is a concave surface. The seventh lens E7 has a negative refractive power. An object-side surface S13 of the seventh lens E7 is a convex surface, and an image-side surface S14 of the seventh lens E7 is a concave surface. The optical filter E8 has an object-side surface S15 and an image-side surface S16. Light from an object sequentially passes through the respective surfaces S1 to S16 and is finally imaged on the imaging plane S17.

Table 16 shows surface type, radius of curvature, thickness, material and conic coefficient of each lens of the optical imaging system in embodiment 6, wherein the units for the radius of curvature and the thickness are millimeter (mm).

TABLE 16

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 | aspheric | 1.9304 | 0.6601 | 1.55 | 64.1 | −1.7598 |
| S2 | aspheric | 4.3163 | 0.0581 | | | −24.3708 |
| S3 | aspheric | 2.8513 | 0.2500 | 1.67 | 20.4 | −5.9284 |
| S4 | aspheric | 1.7356 | 0.1598 | | | −3.8530 |
| S5 | aspheric | 2.1887 | 0.5951 | 1.55 | 64.1 | 0.4289 |
| S6 | aspheric | 18.5223 | 0.0112 | | | 5.0000 |
| STO | spherical | infinite | 0.4352 | | | |
| S7 | aspheric | −142.6097 | 0.3115 | 1.67 | 20.4 | 5.0000 |
| S8 | aspheric | 512.7694 | 0.2361 | | | 5.0000 |
| S9 | aspheric | −21.2564 | 0.3000 | 1.55 | 64.1 | −99.0000 |
| S10 | aspheric | −3.5292 | 0.1622 | | | −86.3823 |
| S11 | aspheric | −17.1131 | 0.3757 | 1.67 | 20.4 | −99.0000 |
| S12 | aspheric | 11.1730 | 0.1809 | | | −99.0000 |
| S13 | aspheric | 3.0648 | 0.4597 | 1.54 | 55.7 | −66.3682 |
| S14 | aspheric | 1.4098 | 0.2265 | | | −10.4359 |
| S15 | spherical | infinite | 0.1100 | 1.52 | 64.2 | |
| S16 | spherical | infinite | 0.5500 | | | |
| S17 | spherical | infinite | | | | |

As can be seen from Table 16, in embodiment 6, the object-side surface and the image-side surface of any one of the first lens E1 to the seventh lens E7 are aspheric. Table 17 below shows high-order coefficients applicable to each aspheric surface in embodiment 6, wherein the surface shape of each aspheric surface can be defined by the formula (1) given in the above embodiment 1.

TABLE 17

| Surface number | A4 | A6 | A8 | A10 | A12 |
|---|---|---|---|---|---|
| S1 | 3.1177E−02 | −1.1008E−02 | 2.3364E−02 | −3.7080E−02 | 3.1040E−02 |
| S2 | 4.1646E−02 | 1.3945E−02 | −8.0924E−02 | 5.2204E−02 | −1.4160E−02 |
| S3 | −7.3662E−02 | 1.4795E−01 | −2.3905E−01 | 2.1203E−01 | −1.1890E−01 |
| S4 | −8.2524E−02 | 1.6766E−01 | −2.6288E−01 | 2.7581E−01 | −1.7813E−01 |
| S5 | −5.5627E−02 | 2.8673E−02 | −5.2592E−04 | −9.2455E−02 | 1.7659E−01 |
| S6 | −1.5480E−02 | 4.9773E−03 | −6.8020E−02 | 1.4936E−01 | −2.0304E−01 |
| S7 | −1.1006E−01 | 1.8973E−01 | −8.2963E−01 | 2.1588E+00 | −3.6614E+00 |
| S8 | −1.4063E−01 | 2.0425E−01 | 4.6558E411 | 6.2004E−01 | −5.1594E−01 |
| S9 | −1.0653E−01 | 1.4984E−01 | −8.7116E−02 | −1.6328E−01 | 2.7403E−01 |
| S10 | −1.4597E−01 | 1.2989E−01 | 2.5213E−02 | −1.4615E−01 | 5.3189E−02 |
| S11 | 1.8204E−01 | −6.1383E−01 | 8.4120E−01 | −7.3857E−01 | 4.0131E−01 |
| S12 | 1.0686E−01 | −2.9825E−01 | 3.0066E−01 | −1.9259E−01 | 7.9030E−02 |
| S13 | −2.2256E−01 | 8.8659E−02 | −1.4963E−02 | 9.6035E−04 | −7.8674E−08 |
| S14 | −1.2483E−01 | 5.9947E−02 | −2.3010E−02 | 7.1448E−03 | −1.6040E−03 |

| Surface number | A14 | A16 | A18 | A20 |
|---|---|---|---|---|
| S1 | −1.5055E−02 | 3.6838E−03 | −3.3778E−04 | 0.0000E+00 |
| S2 | 4.3218E−03 | −2.0612E−03 | 4.0848E−04 | 0.0000E+00 |
| S3 | 4.7869E−02 | −1.2627E−02 | 1.5218E−03 | 0.0000E+00 |
| S4 | 6.6698E−02 | −1.0067E−02 | −4.8600E−04 | 0.0000E+00 |
| S5 | −1.6302E−01 | 7.9165E−02 | −1.5812E−02 | 0.0000E+00 |
| S6 | 1.5682E−01 | −6.1372E−02 | 9.2323E−03 | 0.0000E+00 |
| S7 | 3.9601E+00 | −2.6023E+00 | 9.5160E−01 | −1.4991E−01 |
| S8 | 2.5959E−01 | −5.0349E−02 | −1.0104E−02 | 4.1242E−03 |
| S9 | −2.0912E−01 | 1.1445E−01 | −4.2087E−02 | 6.8422E−03 |
| S10 | 5.7403E−02 | −5.3510E−02 | 1.6305E−02 | −1.7540E−03 |
| S11 | −1.3397E−01 | 2.6826E−02 | −2.9419E−03 | 1.3424E−04 |
| S12 | −2.0406E−02 | 3.2020E−03 | −2.7995E−04 | 1.0564E−05 |
| S13 | 6.9541E−06 | −1.6004E−06 | 6.2513E−08 | 1.2253E−09 |
| S14 | 2.3117E−04 | −1.9624E−05 | 8.7694E−07 | −1.5589E−08 |

Table 18 shows the effective focal length f1 to f7 of respective lens, the total effective focal length f of the optical imaging system, the distance TTL on the optical axis from the object-side surface S1 of the first lens E1 to the imaging plane S17 and half of the diagonal length ImgH of an effective pixel area on the imaging plane S17 in embodiment 6.

TABLE 18

| f1 (mm) | 5.83 | f6 (mm) | −10.09 |
|---|---|---|---|
| f2 (mm) | −7.31 | f7 (mm) | −5.39 |
| f3 (mm) | 4.49 | f (mm) | 4.25 |
| f4 (mm) | −167.39 | TTL (mm) | 5.08 |
| f5 (mm) | 7.71 | ImgH (mm) | 3.65 |

Figure 12A:
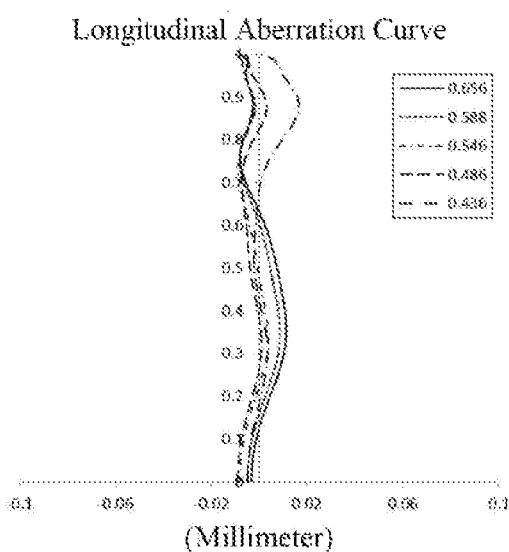
FIGS. 12A to 12D illustrate a longitudinal aberration curve, an astigmatic curve, a distortion curve and a lateral color curve of the optical imaging system of the embodiment 6, respectively.
Figure 12B:
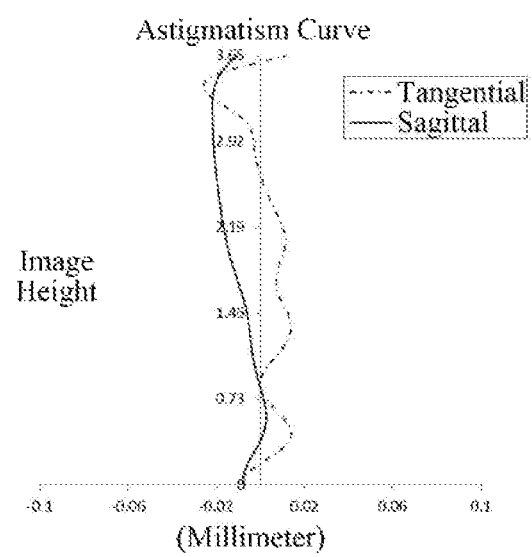
Figure 12C:
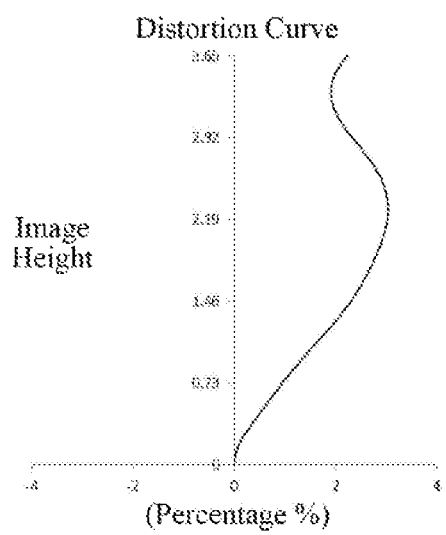
Figure 12D:
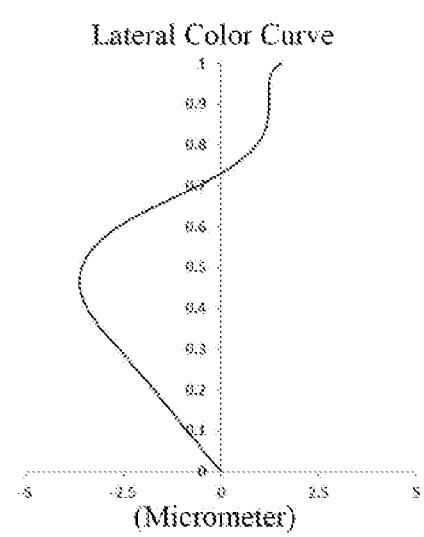

FIG. 12A illustrates a longitudinal aberration curve of the optical imaging system according to embodiment 6, representing deviations of focal points converged by light of different wavelengths after passing through the optical imaging system. FIG. 12B illustrates an astigmatism curve of the optical imaging system according to embodiment 6, representing a curvature of a tangential plane and a curvature of a sagittal plane. FIG. 12C illustrates a distortion curve of the optical imaging system according to embodiment 6, representing amounts of distortion at different field of view. FIG. 12D illustrates a lateral color curve of the optical imaging system according to embodiment 6, representing deviations of different image heights on an imaging plane after light passes through the optical imaging system. It can be seen from FIG. 12A to FIG. 12D that the optical imaging system provided in embodiment 6 can achieve good image quality.

Embodiment 7

Figure 13:
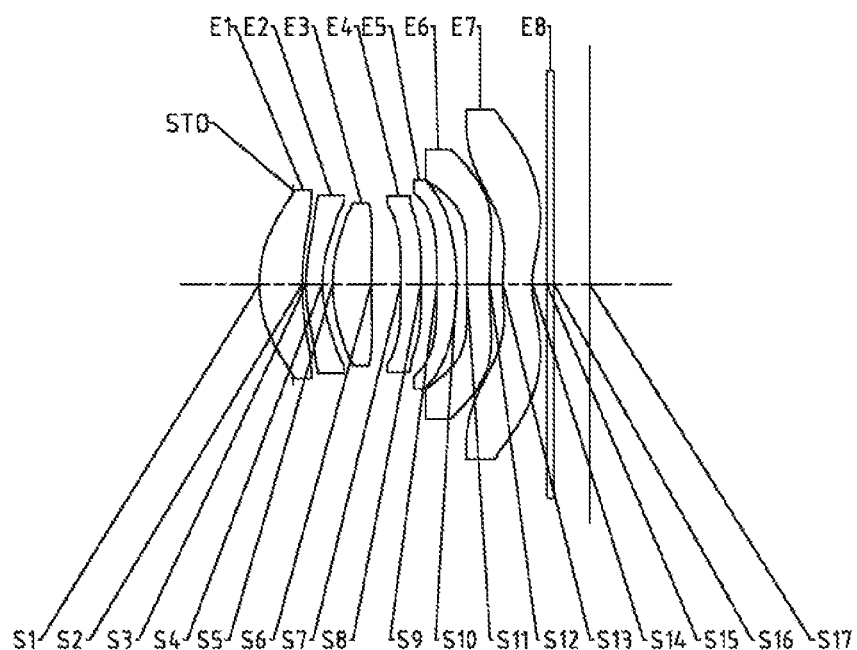
FIG. 13 illustrates a schematic structural view of an optical imaging system according to embodiment 7 of the present disclosure.

An optical imaging system according to embodiment 7 of the present disclosure is described below with reference to FIG. 13 to FIG. 14D. FIG. 13 is a schematic structural view of the optical imaging system according to embodiment 7 of the present disclosure.

As shown in FIG. 13, the optical imaging system according to an exemplary implementation of the present disclosure includes a diaphragm STO, a first lens E1, a second lens E2, a third lens E3, a fourth lens E4, a fifth lens E5, a sixth lens E6, a seventh lens E7, an optical filter E8 and an imaging plane S17, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a concave surface, and an image-side surface S8 of the fourth lens E4 is a concave surface. The fifth lens E5 has a positive refractive power. An object-side surface S9 of the fifth lens E5 is a concave surface, and an image-side surface S10 of the fifth lens E5 is a convex surface. The sixth lens E6 has a negative refractive power. An object-side surface S11 of the sixth lens E6 is a concave surface, and an image-side surface S12 of the sixth lens E6 is a concave surface. The seventh lens E7 has a negative refractive power. An object-side surface S13 of the seventh lens E7 is a convex surface, and an image-side surface S14 of the seventh lens E7 is a concave surface. The optical filter E8 has an object-side surface S15 and an image-side surface S16. Light from an object sequentially passes through the respective surfaces S1 to S16 and is finally imaged on the imaging plane S17.

Table 19 shows surface type, radius of curvature, thickness, material and conic coefficient of each lens of the optical imaging system in embodiment 7, wherein the units for the radius of curvature and the thickness are millimeter (mm).

TABLE 19

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.5200 | | | |
| S1 | aspheric | 1.9327 | 0.6598 | 1.55 | 64.1 | −1.7592 |
| S2 | aspheric | 4.2266 | 0.0604 | | | −24.4763 |
| S3 | aspheric | 2.7451 | 0.2500 | 1.67 | 20.4 | −5.9040 |
| S4 | aspheric | 1.7132 | 0.1564 | | | −3.8386 |
| S5 | aspheric | 2.1845 | 0.5972 | 1.55 | 64.1 | 0.4231 |
| S6 | aspheric | 18.9173 | 0.4525 | | | 5.0000 |
| S7 | aspheric | −92.1335 | 0.3111 | 1.67 | 20.4 | −99.0000 |
| S8 | aspheric | 282.3978 | 0.2438 | | | 5.0000 |
| S9 | aspheric | −19.5222 | 0.3022 | 1.67 | 20.4 | −99.0000 |
| S10 | aspheric | −4.0014 | 0.1612 | | | −86.2296 |
| S11 | aspheric | −14.2454 | 0.3501 | 1.67 | 20.4 | −70.1298 |
| S12 | aspheric | 14.0214 | 0.2007 | | | −8.9672 |
| S13 | aspheric | 3.2985 | 0.4512 | 1.54 | 55.7 | −65.1972 |
| S14 | aspheric | 1.4393 | 0.2239 | | | −9.7969 |
| S15 | spherical | infinite | 0.1100 | 1.52 | 64.2 | |
| S16 | spherical | infinite | 0.5500 | | | |
| S17 | spherical | infinite | | | | |

As can be seen from Table 19, in embodiment 7, the object-side surface and the image-side surface of any one of the first lens E1 to the seventh lens E7 are aspheric. Table 20 below shows high-order coefficients applicable to each aspheric surface in embodiment 7, wherein the surface shape of each aspheric surface can be defined by the formula (1) given in the above embodiment 1.

TABLE 20

| Surface number | A4 | A6 | A8 | A10 | A12 |
|---|---|---|---|---|---|
| S1 | 3.1166E−02 | −1.1016E−02 | 2.3367E−02 | −3.7078E−02 | 3.1040E−02 |
| S2 | 4.1577E−02 | 1.4613E−02 | −8.6373E−02 | 6.4292E−02 | −2.6048E−02 |
| S3 | −7.4484E−02 | 1.5505E−01 | −2.5889E−01 | 2.4075E−01 | −1.4337E−01 |
| S4 | −8.3345E−02 | 1.8187E−01 | −3.1147E−01 | 3.6322E−01 | −2.7422E−01 |
| S5 | −5.8667E−02 | 4.4037E−02 | −4.7229E−02 | −8.2598E−02 | 8.4418E−02 |
| S6 | −1.5378E−01 | −1.2549E−03 | −4.7296E−02 | 1.1429E−01 | −1.6797E−01 |
| S7 | −1.0820E−01 | 1.7397E−01 | −7.6084E−01 | 1.9650E+00 | −3.3197E+00 |
| S8 | −1.3591E−01 | 1.9794E−01 | −4.7343E−01 | 6.5705E−01 | −5.7919E−01 |
| S9 | −1.0841E−01 | 1.7582E−01 | −1.7576E−01 | 5.5332E−03 | 7.1279E−02 |
| S10 | −1.6401E−01 | 2.3090E−01 | −2.2353E−01 | 1.9451E−01 | −2.3728E−01 |
| S11 | 1.3647E−01 | −4.5756E−01 | 5.8251E−01 | −4.8917E−01 | 2.5200E−01 |
| S12 | 1.0692E−01 | −2.8683E−01 | 2.8920E−01 | −1.9005E−01 | 8.2304E−02 |
| S13 | −2.2245E−01 | 8.8663E−02 | −1.4964E−02 | 9.6020E−04 | −1.1445E−07 |
| S14 | −1.3337E−01 | 6.8143E−02 | −3.0203E−02 | 1.0430E−02 | −2.4716E−03 |

| Surface number | A14 | A16 | A18 | A20 |
|---|---|---|---|---|
| S1 | −1.5055E−02 | 3.6836E−03 | −3.3793E−04 | 0.0000E+00 |
| S2 | 1.0308E−02 | −3.5955E−03 | 5.6944E−04 | 0.0000E+00 |
| S3 | 6.0226E−02 | −1.6047E−02 | 1.9228E−03 | 0.0000E+00 |
| S4 | 1.3001E−01 | −3.2635E−02 | 2.8225E−03 | 0.0000E+00 |
| S5 | −1.0321E−01 | 5.8285E−02 | −1.2833E−02 | 0.0000E+00 |
| S6 | 1.3703E−01 | −5.5629E−02 | 8.5678E−03 | 0.0000E+00 |
| S7 | 3.5925E+00 | −2.3668E+00 | 8.6885E−01 | −1.3763E−01 |
| S8 | 3.2354E−01 | −8.8911E−02 | 2.4451E−03 | 2.4465E−03 |
| S9 | −4.8519E−02 | 3.3287E−02 | −1.8658E−02 | 3.9353E−03 |
| S10 | 2.1545E−01 | −1.0682E−01 | 2.6432E−02 | −2.5799E−03 |
| S11 | −7.7672E−02 | 1.3833E−02 | −1.2687E−03 | 4.2235E−05 |
| S12 | −2.3056E−02 | 4.0263E−03 | −4.0028E−04 | 1.7393E−05 |
| S13 | 6.9475E−06 | −E6014E−06 | 6.2441E−08 | 1.2428E−09 |
| S14 | 3.6953E−04 | −3.2587E−05 | 1.5234E−06 | −2.8592E−08 |

Table 21 shows the effective focal length f1 to f7 of respective lens, the total effective focal length f of the optical imaging system, the distance TTL on the optical axis from the object-side surface S1 of the first lens E1 to the imaging plane S17 and half of the diagonal length ImgH of an effective pixel area on the imaging plane S17 in embodiment 7.

TABLE 21

| f1 (mm) | 5.92 | f6 (mm) | −10.56 |
|---|---|---|---|
| f2 (mm) | −7.58 | f7 (mm) | −5.20 |
| f3 (mm) | 4.47 | f (mm) | 4.25 |
| f4 (mm) | −104.32 | TTL (mm) | 5.08 |
| f5 (mm) | 7.50 | ImgH (mm) | 3.65 |

Figure 14A:
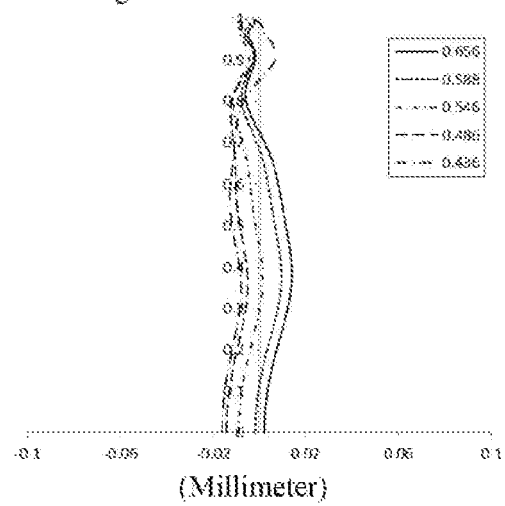
FIGS. 14A to 14D illustrate a longitudinal aberration curve, an astigmatic curve, a distortion curve and a lateral color curve of the optical imaging system of the embodiment 7, respectively.
Figure 14B:
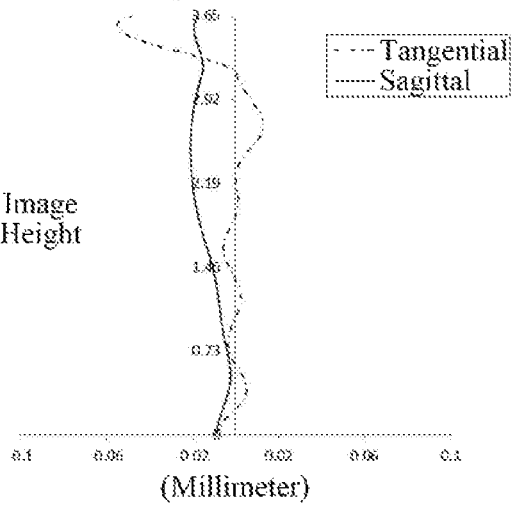
Figure 14C:
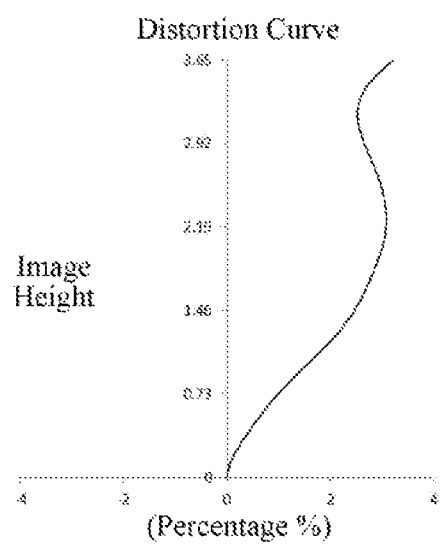
Figure 14D:
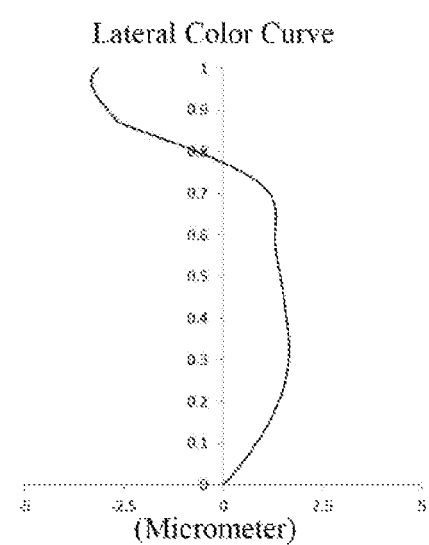

FIG. 14A illustrates a longitudinal aberration curve of the optical imaging system according to embodiment 7, representing deviations of focal points converged by light of different wavelengths after passing through the optical imaging system. FIG. 14B illustrates an astigmatism curve of the optical imaging system according to embodiment 7, representing a curvature of a tangential plane and a curvature of a sagittal plane. FIG. 14C illustrates a distortion curve of the optical imaging system according to embodiment 7, representing amounts of distortion at different field of view. FIG. 14D illustrates a lateral color curve of the optical imaging system according to embodiment 7, representing deviations of different image heights on an imaging plane after light passes through the optical imaging system. It can be seen from FIG. 14A to FIG. 14D that the optical imaging system provided in embodiment 7 can achieve good image quality.

In view of the above, embodiments 1 to 7 respectively satisfy the relationship shown in Table 22.

TABLE 22

| Formula | Embodiment | | | | | | |
|---|---|---|---|---|---|---|---|
| | 1 | 2 | 3 | 4 | 5 | 6 | 7 |
| f/EPD | 1.46 | 1.27 | 1.28 | 1.27 | 1.28 | 1.27 | 1.48 |
| CT7/CT5*TAN(HFOV) | 1.21 | 1.14 | 1.11 | 1.12 | 1.10 | 1.28 | 1.24 |
| (R1 + R2)/(R1 − R2) | −2.31 | −2.63 | −2.74 | −2.62 | −2.63 | −2.62 | −2.69 |
| TTL/ImgH | 1.40 | 1.39 | 1.39 | 1.39 | 1.39 | 1.39 | 1.39 |
| f/R3 − f/R5 | 0.05 | −0.37 | −0.39 | −0.48 | −0.45 | −0.45 | −0.40 |
| (f2 − f4)/(f2 + f4) | −1.18 | −0.52 | −0.53 | −0.75 | −0.79 | −0.92 | −0.86 |
| DT71/DT31 | 2.34 | 1.97 | 1.89 | 1.86 | 1.89 | 1.93 | 1.91 |
| |SAG62/CT6| | 0.82 | 1.39 | 1.33 | 1.49 | 1.64 | 1.73 | 1.72 |
| ΣAT/(T56 + T12) | 5.86 | 5.38 | 5.17 | 5.15 | 4.94 | 5.65 | 5.75 |
| (1/f5 + 1/f6)/(f/f1 + f/f3) | 0.34 | 0.39 | 0.40 | 0.40 | 0.41 | 0.08 | 0.10 |
| CT3/T34 | 1.31 | 1.00 | 1.33 | 1.39 | 1.37 | 1.33 | 1.32 |

The present disclosure further provides an imaging apparatus, having a photosensitive element which may be a photosensitive charge-coupled device (CCD) or a complementary metal-oxide semiconductor (CMOS). The imaging apparatus may be an independent imaging device such as a digital camera, or may be an imaging module integrated in a mobile electronic device such as a mobile phone. The imaging apparatus is equipped with the optical imaging system described above.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging system, comprising: a first lens, a second lens, a third lens, a fourth lens, a fifth lens, a sixth lens and a seventh lens, sequentially from an object side to an image side along an optical axis,
   wherein,
   the first lens and the third lens each has a positive refractive power;
   the second lens, the fourth lens, the fifth lens, the sixth lens, and the seventh lens each has a positive refractive power or a negative refractive power;
   an object-side surface of the first lens is a convex surface and an image-side surface of the first lens is a concave surface;
   an image-side surface of the second lens is a concave surface;
   an object-side surface of the third lens is a convex surface;
   an object-side surface of the seventh lens is a convex surface and an image-side surface of the seventh lens is a concave surface;
   the optical imaging system satisfies:

$f/EPD \leq 1.5$;

$-1.5 < (f2-f4)/(f2+f4) < -0.5$; and $1 < CT7/CT5 \times TAN(HFOV) < 2$, where f is a total effective focal length of the optical imaging system, EPD is an entrance pupil diameter of the optical imaging system, f2 is an effective focal length of the second lens, and f4 is an effective focal length of the fourth lens, CT7 is a center thickness of the seventh lens on the optical axis, CT5 is a center thickness of the fifth lens on the optical axis, and HFOV is half of a maximal field-of-view of the optical imaging system.

2. The optical imaging system according to claim 1, wherein the optical imaging system satisfies: $-3 < (R1+R2)/(R1-R2) < -2$,
   where R1 is a radius of curvature of the object-side surface of the first lens, and R2 is a radius of curvature of the image-side surface of the first lens.

3. The optical imaging system according to claim 1, wherein the optical imaging system satisfies: $-0.5 < f/R3 - f/R5 < 0.3$,
   where f is the total effective focal length of the optical imaging system, R3 is a radius of curvature of an object-side surface of the second lens, and R5 is a radius of curvature of the object-side surface of the third lens.

4. The optical imaging system according to claim 1, wherein the optical imaging system satisfies: $1.5 < DT71/DT31 < 2.5$,
   where DT71 is a maximum effective radius of the object-side surface of the seventh lens, and DT31 is a maximum effective radius of the object-side surface of the third lens.

5. The optical imaging system according to claim 1, wherein the optical imaging system satisfies: $0.5 < |SAG62/CT6| < 2$,
   where SAG62 is an axial distance from an intersection of an image-side surface of the sixth lens and the optical axis to an apex of a maximum effective radius of the image-side surface of the sixth lens, and CT6 is a center thickness of the sixth lens on the optical axis.

6. The optical imaging system according to claim 1, wherein the optical imaging system satisfies: $0 < (1/f5+1/f6)/(1/f1+1/f3) < 0.5$,
   where f1 is an effective focal length of the first lens, f3 is an effective focal length of the third lens, f5 is an effective focal length of the fifth lens, and f6 is an effective focal length of the sixth lens.

7. The optical imaging system according to claim 1, wherein the optical imaging system satisfies: $1.0 \leq CT3/T34 < 1.5$,
   where CT3 is a center thickness of the third lens on the optical axis, and T34 is a spaced distance of the third lens and the fourth lens on the optical axis.

8. The optical imaging system according to claim 1, wherein the optical imaging system satisfies: $TTL/ImgH < 1.5$,
   where TTL is a distance on the optical axis from the object-side surface of the first lens to an imaging plane of the optical imaging system, and ImgH is half of a diagonal length of an effective pixel area on the imaging plane of the optical imaging system.

9. The optical imaging system according to claim 1, wherein the optical imaging system satisfies: $4.5 < \Sigma AT/(T56+T12) < 6$,
   where $\Sigma AT$ is a sum of spaced distances on the optical axis between adjacent lenses of the first lens to the seventh lens, T56 is a spaced distance of the fifth lens and the sixth lens on the optical axis, and T12 is a spaced distance of the first lens and the second lens on the optical axis.

* * * * *